(12) United States Patent
Mori et al.

(10) Patent No.: US 8,272,256 B2
(45) Date of Patent: Sep. 25, 2012

(54) PRESSURE SENSOR

(75) Inventors: Takashi Mori, Inuyama (JP); Takuya Mizuno, Hashima (JP); Toshiyuki Matsuoka, Nagoya (JP); Yoshinori Tsujimura, Kasugai (JP); Takio Kojima, Ichinomiya (JP); Yuzo Higuchi, Komaki (JP)

(73) Assignee: NGK Spark Plug Co., Ltd., Aichi (JP)

( * ) Notice: Subject to any disclaimer, the term of this patent is extended or adjusted under 35 U.S.C. 154(b) by 434 days.

(21) Appl. No.: 12/569,939

(22) Filed: Sep. 30, 2009

(65) Prior Publication Data

US 2010/0077844 A1  Apr. 1, 2010

(30) Foreign Application Priority Data

Sep. 30, 2008 (JP) ................... 2008-252244
Jan. 30, 2009 (JP) ................... 2009-019789
Jan. 30, 2009 (JP) ................... 2009-019802
Sep. 17, 2009 (JP) ................... 2009-215982

(51) Int. Cl.
*G01M 15/08* (2006.01)

(52) U.S. Cl. .................... 73/114.18

(58) Field of Classification Search ........... 73/114.18, 73/114.19, 862.621, 862.627, 862.632, 862.68
See application file for complete search history.

(56) References Cited

U.S. PATENT DOCUMENTS

| | | | | |
|---|---|---|---|---|
| 4,833,929 A * | 5/1989 | Omura et al. | .............. | 73/862.68 |
| 4,993,266 A | 2/1991 | Omura et al. | | |
| 5,182,233 A * | 1/1993 | Inoue | .............. | 83/35 |
| 5,341,688 A * | 8/1994 | Morikawa et al. | .............. | 73/862.68 |
| 5,349,873 A | 9/1994 | Omura et al. | | |
| 5,773,728 A | 6/1998 | Tsukada et al. | | |
| 6,598,484 B2 | 7/2003 | Tanizawa | | |
| 6,951,142 B2 * | 10/2005 | Ohsato et al. | ............ | 73/862.041 |
| 7,002,227 B2 * | 2/2006 | Toyoda et al. | ................ | 257/417 |
| 2004/0169242 A1 * | 9/2004 | Toyoda et al. | ................ | 257/414 |
| 2010/0079155 A1 * | 4/2010 | Matsuoka et al. | ............ | 324/691 |

FOREIGN PATENT DOCUMENTS

| | | |
|---|---|---|
| JP | 6054274 B2 | 7/1994 |
| JP | 7014069 B2 | 2/1995 |
| JP | 7083129 B | 9/1995 |
| JP | 3116384 B2 | 12/2000 |
| JP | 3166015 B2 | 3/2001 |
| JP | 2002116105 A | 4/2002 |
| JP | 3317084 B2 | 6/2002 |

* cited by examiner

*Primary Examiner* — Freddie Kirkland, III
(74) *Attorney, Agent, or Firm* — Sughrue Mion, PLLC

(57) ABSTRACT

A pressure sensor has a Si device having a first main surface that has a bonded area, a second main surface parallel to the first main surface, a pressure-sensitive resistor formed on the first main surface, and a joining assist pattern formed on the first main surface, and a pressing member bonded to the bonded area on the first main surface and compressing the Si device in a thickness direction. The pressure-sensitive resistor has a first bonded section which is placed within the bonded area of the first main surface and is bonded to the pressing member. The joining assist pattern has a second bonded section which is made of the same material as the first bonded section of the pressure-sensitive resistor and is placed within the bonded area of the first main surface and is bonded to the pressing member.

22 Claims, 14 Drawing Sheets

PRESSURE SENSOR

BACKGROUND OF THE INVENTION

The present invention relates to a pressure sensor that is capable of detecting a pressure such as a cylinder internal pressure in an internal combustion engine, and more particularly to a pressure sensor that has a plate-shaped Si device for detecting the pressure, which is an object of detection, and a pressing member that is bonded to one main surface of the Si device and presses the main surface by a pressing force according to the pressure.

In recent years, as a pressure sensor that is capable of detecting a pressure P such as a cylinder internal pressure in an internal combustion engine, there have been proposed and developed various pressure sensors having a Si device for detecting the pressure P through a stress that occurs to the Si device itself according to the pressure P by piezoresistive effect. One such pressure sensor has been disclosed in Japanese Patent Document 1 (Patent No. 3317084, see the following Related Art Documents). In Patent Document 1, the pressure sensor has a plate-shaped Si device and a pressing member. The pressing member is bonded to one main surface of the Si device, and presses the main surface by a pressing force according to the pressure P.

A force transducer in Patent Document 1 has a silicon single crystal (Si device), a pressure transfer block (pressing member) that is bonded to (100) plane of the silicon single crystal, and a base (supporting member) which is made of glass-ceramic and bonded to the other main surface of the silicon single crystal (see FIG. 1 and its description in Patent Document 1). The pressure transfer block is made of glass-ceramic and serves to transmit a pressing force, which is applied to an opposite surface to the semiconductor crystal side, to the semiconductor crystal. On the (100) plane of the silicon single crystal, a square ring-shaped gage (resistor) that arranges a bridge and lead members that connect with the gage are formed. The gage, a part of each lead member and the pressure transfer block are bonded together through electrostatic bonding, then the silicon single crystal and the pressure transfer block are bonded together.

As the pressure sensors having the plate-shaped Si device and the pressing member bonded to the main surface of the Si device, they have been disclosed in the following Japanese Patent Documents 2~6.
(Related Art Documents)
Patent Document 1: Japanese Patent No. 3317084
Patent Document 2: Japanese Patent Provisional Publication No. 7-83129 (hereinafter is referred to as "JP7-83129")
Patent Document 3: Japanese Patent No. 3166015
Patent Document 4: JP7-14069
Patent Document 5: JP6-54274
Patent Document 6: Japanese Patent No. 3116384

SUMMARY OF THE INVENTION

In the force transducer in Patent Document 1, however, since a directly bonding portion between the silicon single crystal and the pressure transfer block is only the gage and the part of each lead member as described above, a bonding area is small. Because of this, a connection strength (or bonding strength) between these silicon single crystal and pressure transfer block becomes low, and reliability of the joining between the silicon single crystal and the pressure transfer block are not sufficient.

Further, in any of the pressure sensors in Patent Documents 1~6, the pressing member is bonded to only a limited or confined area in the middle on the main surface of the Si device, and the pressing member is not bonded to a peripheral area of this middle area. In the pressure sensors having such structure or configuration, it has been found that when an offset load component exists in a load (pressing force) acting on the pressing member by the pressure P, a magnitude of resistance change occurring to the Si device (pressure-sensitive resistor) by piezoresistive effect is affected by this offset load.

Furthermore, the pressing member receives not only the load acting in a direction (axial direction) orthogonal to the main surface of the Si device, but a load that pulsates or oscillates in a direction (lateral direction) orthogonal to the axial direction might act on the pressing member. It has been found that even in the case where the load oscillating in the lateral direction acts on the pressing member, the magnitude of resistance change occurring to the Si device (pressure-sensitive resistor) is affected by this load. That is, there is a possibility that the related art pressure sensor cannot accurately detect the pressure P.

It is therefore an object of the present invention to provide a pressure sensor that has a plate-shaped Si device having first and second main surfaces and a pressing member bonded to the first main surface of the Si device. The pressure sensor has a structure or configuration that can enhance a connection strength between the Si device and the pressing member, the pressure sensor having high reliability of the joining between the Si device and the pressing member can therefore be provided.

In addition, it is another object of the present invention to provide a pressure sensor that has a plate-shaped Si device having first and second main surfaces and a pressing member bonded to the first main surface of the Si device and pressing the first main surface. The pressure sensor has a structure or configuration in which even if the offset load component and/or the load oscillating in the lateral direction exist in the load acting on the pressing member by the cylinder internal pressure P, the magnitude of resistance change occurring to a pressure-sensitive resistor of the Si device is less susceptible to these loads. The pressure sensor accurately detecting the pressure P can therefore be provided.

According to one aspect of the present invention, a pressure sensor comprises: a Si device for detecting a pressure P, which is an object of detection, through detection of a stress occurring to the Si device itself by the pressure P, the Si device formed from a plate-shaped SOI substrate and having (a) a first main surface that has a bonded area, (b) a second main surface that is parallel to the first main surface, (c) a pressure-sensitive resistor which is formed on the first main surface and whose resistance changes according to the pressure P, and (d) a joining assist pattern that is formed on the first main surface, and a pressing member bonded to the bonded area on the first main surface of the Si device through anodic bonding, and compressing the Si device in a thickness direction of the Si device by pressing the bonded area by a pressing force according to the pressure P, and the pressure-sensitive resistor has a first bonded section which is placed within the bonded area of the first main surface and is bonded to the pressing member, and the joining assist pattern has a second bonded section which is made of the same material as the first bonded section of the pressure-sensitive resistor and is placed within the bonded area of the first main surface and is bonded to the pressing member.

According to another aspect of the present invention, a pressure sensor comprises: a Si device for detecting a pressure P, which is an object of detection, through detection of a stress occurring to the Si device itself by the pressure P, the Si device formed into a rectangular plate shape and having (a) a first main surface that has a pressure-sensitive part area, (b) a second main surface that is parallel to the first main surface, (c) a pressure-sensitive resistor which is formed on the first main surface and whose first resistance changes according to the pressure P, and a pressing member bonded to the first main surface of the Si device, and compressing the Si device in a thickness direction of the Si device by pressing the first main surface by a pressing force according to the pressure P, and the pressing member is bonded to the first main surface except for four corner sections of the first main surface with the pressing member reaching up to four outer circumferential edges which define the first main surface, and the pressure-sensitive resistor is symmetrical about a center of the pressure-sensitive part area where the pressure-sensitive resistor is formed on the first main surface of the Si device.

The other objects and features of this invention will become understood from the following description with reference to the accompanying drawings.

DETAILED DESCRIPTION OF THE INVENTION

Embodiments of a pressure sensor will be explained below with reference to the drawings.

Embodiment 1

Figure 1:
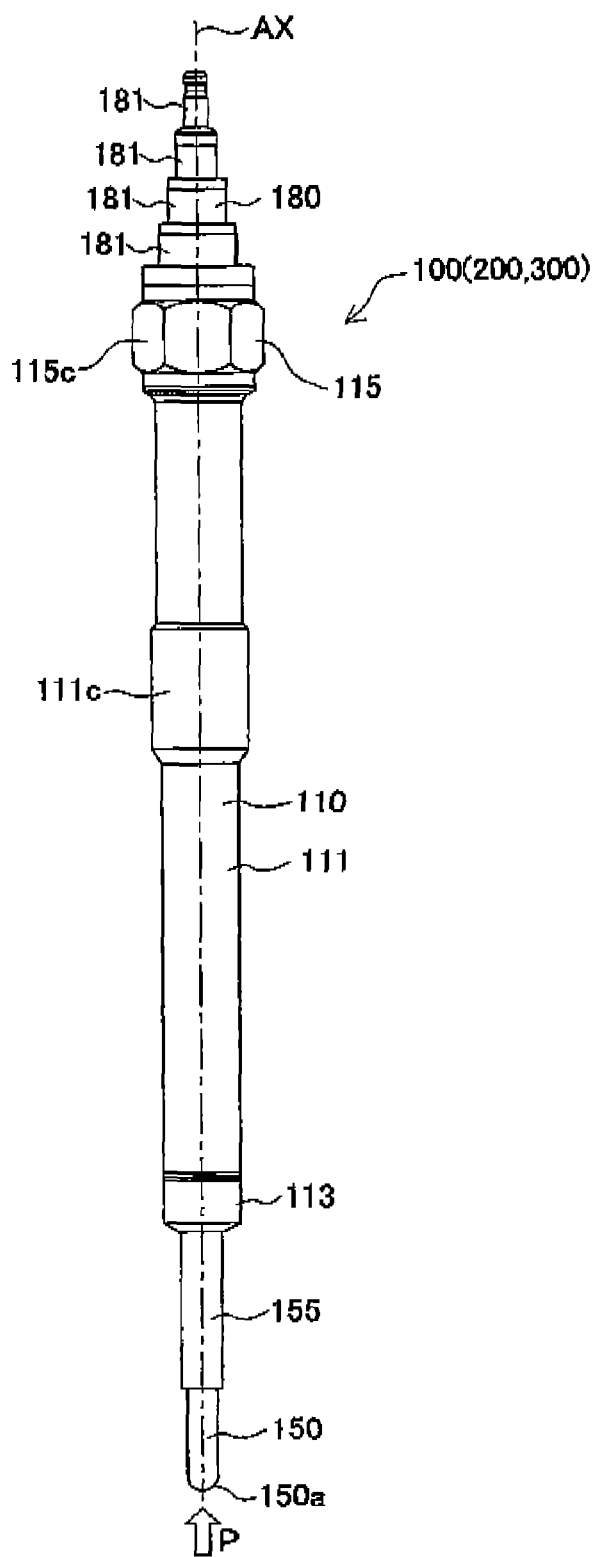
FIG. 1 is an outward appearance of a glow plug with cylinder internal pressure sensor of embodiments 1, 2 and 3.

FIG. 1 shows an outward appearance of a glow plug with cylinder internal pressure sensor (pressure detection apparatus) 100 of an embodiment 1. FIGS. 2 to 5 show longitudinal cross sections of the glow plug with cylinder internal pressure sensor 100. In FIGS. 1 to 5, a lower side of the glow plug 100 is termed an axis AX direction top end side (hereinafter simply called the top end side), and an upper side of the glow plug 100 is termed an axis AX direction base end side (hereinafter simply called the base end side).

Figure 2:
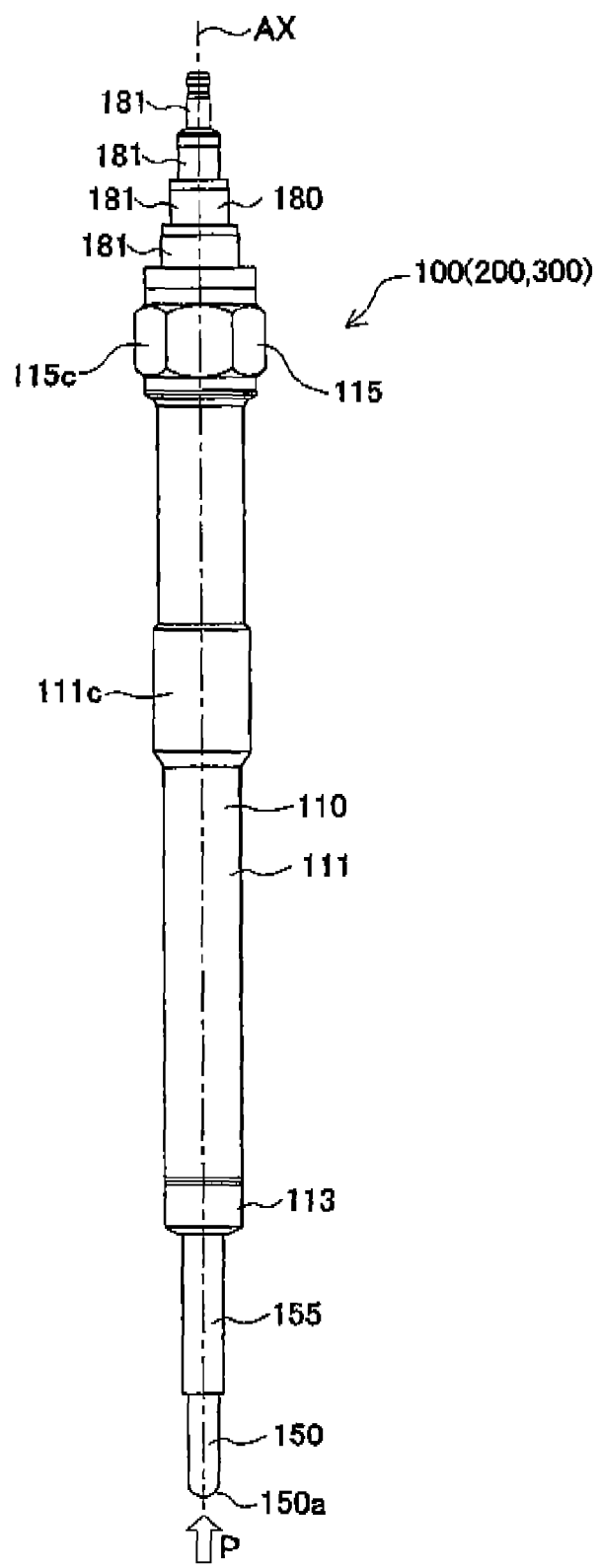
FIG. 2 is a sectional view of the glow plug with cylinder internal pressure sensor of embodiments 1, 2 and 3.
Figure 3:
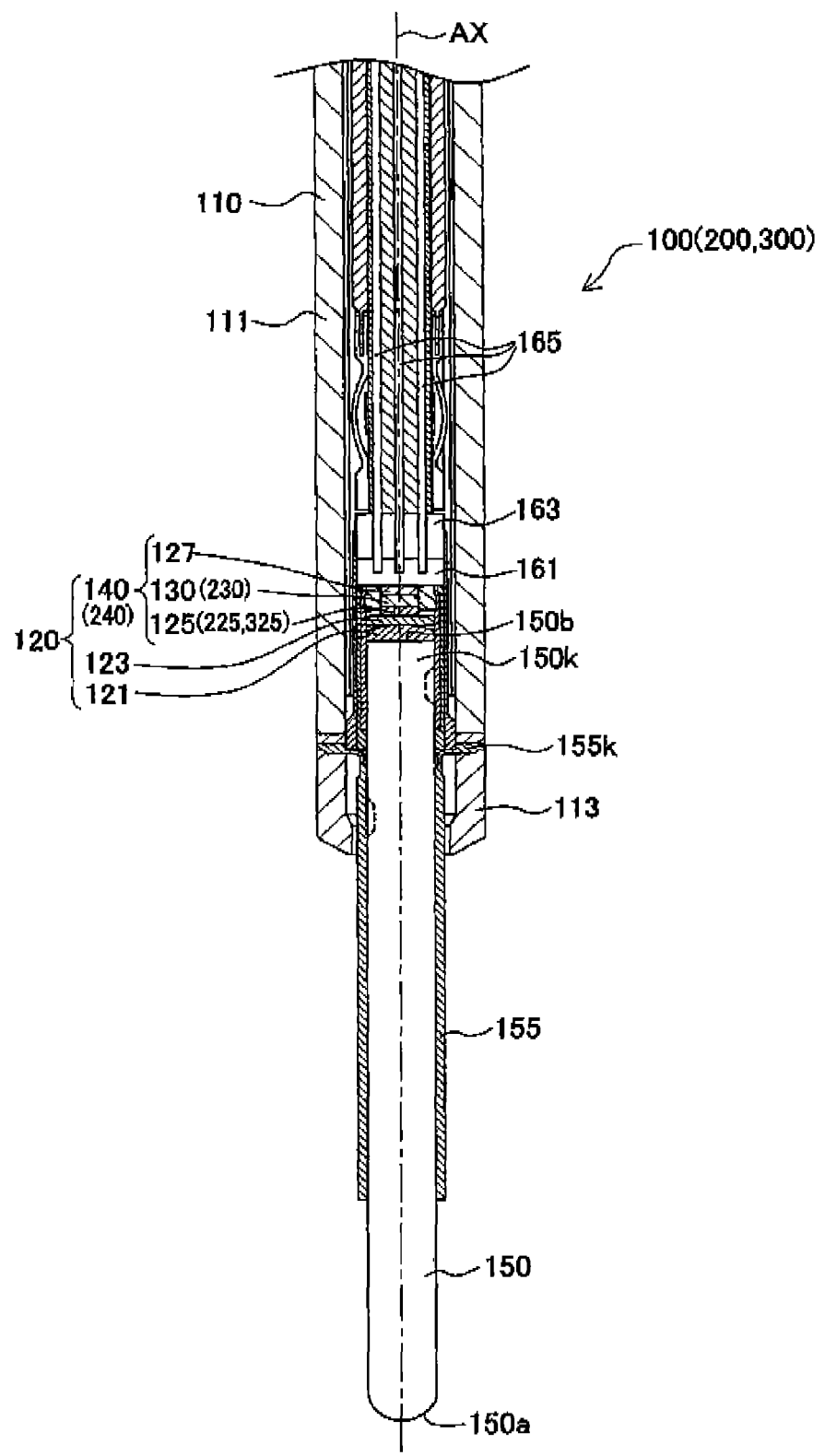
FIG. 3 is a sectional view showing a top end side of the glow plug with cylinder internal pressure sensor of embodiments 1, 2 and 3.

The glow plug with cylinder internal pressure sensor 100 of the embodiment 1 has not only a function as the glow plug but also a function of detecting a pressure (a cylinder internal pressure) P. In addition, this glow plug with cylinder internal pressure sensor 100 also has a function of detecting a temperature T of a Si (silicon) device (or element) 130 that is built in the glow plug 100. As shown in FIGS. 1 to 3, the glow plug with cylinder internal pressure sensor 100 has a tubular housing 110 that extends in the axis AX direction, a pressure detecting system 120 and a wiring board (or circuit board) 170 which are housed inside the housing 110, a heater 150 that protrudes from the housing 110 toward the top end side, an external terminal portion 180 that protrudes from the housing 110 toward the base end side, and so on.

The housing 110 is made of metal (e.g. carbon steel). The housing 110 has a housing body 111 extending in the axis AX direction, a top end side housing portion 113 fixed to a top end side of the housing body 111, and a base end side housing portion 115 fixed to a base end side of the housing body 111.

The housing body 111 has large length in the axis AX direction, thus most of the housing 110 is formed by this housing body 111. Inside the housing body 111, after-mentioned pressure detecting system 120 and circuit board 170 etc. are housed. And as can be seen in FIGS. 1 and 2, a screw portion 111c is provided in a certain position on an outer circumference of the housing body 111, located at almost central portion in the axis AX direction of the housing body 111, so as to secure the glow plug with cylinder internal pressure sensor 100 to an internal combustion engine (diesel engine) (not shown). Here, in FIGS. 1, 2 and 4, a screw thread of the screw portion 111c is omitted.

As seen in the drawings, an after-mentioned base end side portion of the heater 150 is inserted into the top end side housing portion 113. On the other hand, a tool engagement portion 115c is provided on an outer circumference of the base end side housing portion 115. A cross-sectional profile of this tool engagement portion 115c is hexagon for fitting a tool such as a ratchet wrench. Then, by tightening the tool engagement portion 115c with the ratchet wrench, the glow plug 100 is screwed through the screw portion 111c and secured to the internal combustion engine. Further, an after-mentioned top end side portion of the external terminal portion 180 is inserted into the base end side housing portion 115, and wiring (wires) 171, 171, . . . etc. pass through the base end side housing portion 115.

Figure 5:
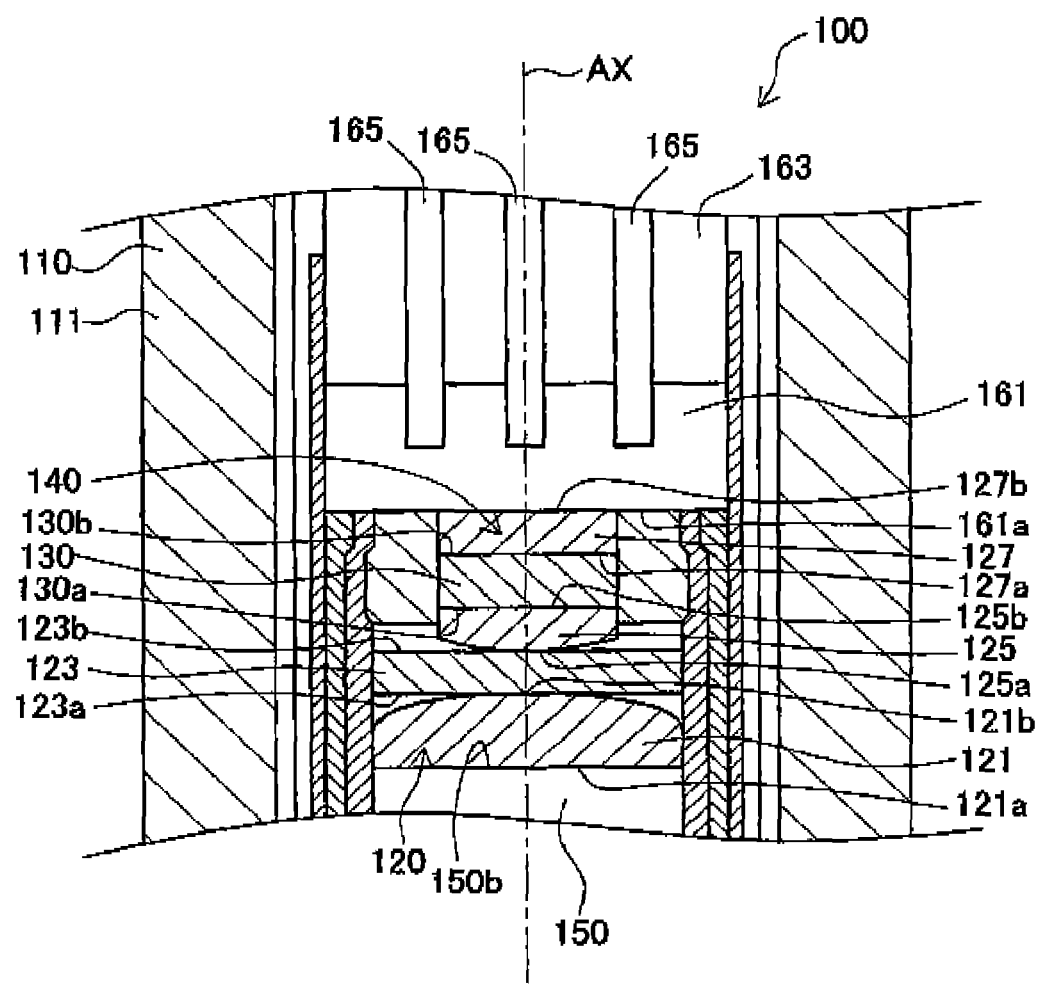
FIG. 5 is a locally enlarged sectional view showing a pressure detecting system and its surrounding components, of the glow plug with cylinder internal pressure sensor of embodiment 1.

The pressure detecting system 120 built inside the housing body 111 has a top end member 121, an intermediate member 123, a pressing member 125, the Si device 130, and a supporting member 127, then these are placed in this order from top end side toward base end side (see FIGS. 3 and 5).

The top end member 121 is made of metal (e.g. SUS430, SUJ), and has a top end surface 121a and a base end surface 121b. The top end surface 121a is a plane surface (more specifically, a circular plane surface), and touches or is contiguous with an after-mentioned base end surface 150b of the heater 150. On the other hand, as for the base end surface 121b, its center swells up, and the base end surface 121b has a rounded surface. That is, the base end surface 121b has a domed shape. A top portion of the base end surface 121b (i.e. the swelling center of the base end surface 121b) touches or is contiguous with a top end surface 123a (described next) of the intermediate member 123.

The intermediate member 123 is made of metal (e.g. SUS430), and is formed into a plate (disc-shaped plate). The intermediate member 123 has the top end surface 123a and a base end surface 123b that is parallel to the top end surface 123a. As described above, the top end surface 123a touches or is contiguous with the base end surface 121b of the top end member 121. On the other hand, the base end surface 123b touches or is contiguous with a top end surface 125a (described next) of the pressing member 125.

The pressing member 125 is made of glass, and has the top end surface 125a and a base end surface 125b. A center of the top end surface 125a protrudes or swells up toward the top end side, and the top end surface 125a has a rounded surface. That is, the top end surface 125a has a domed shape. On the other hand, the base end surface 125b is a plane surface. As explained above, the top end surface 125a touches or is contiguous with the base end surface 123b of the intermediate member 123. On the other hand, the base end surface 125b touches or is contiguous with a first main surface 130a (described next) of the Si device 130, which is a top end surface of the Si device 130. More specifically, these base end surface 125b of the pressing member 125 and first main surface 130a of the Si device 130 are joined or bonded together, with the both surfaces 125b and 130a being contiguous, through anodic bonding. Detail of the pressing member 125 will be described later.

The Si device 130 has the first main surface 130a, which is the top end surface of the Si device 130, and a second main surface 130b, which is a base end surface of the Si device 130 and is parallel to the first main surface 130a. The Si device 130 has a plate shape (rectangular plate shape). As mentioned above, the first main surface 130a touches or is contiguous with the base end surface 125b of the pressing member 125, and bonds to the base end surface 125b. On the other hand, the second main surface 130b touches or is contiguous with a top end surface 127a (described next) of the supporting member 127. More specifically, these second main surface 130b of the Si device 130 and top end surface 127a of the supporting member 127 are joined or bonded together, with the both surfaces 130b and 127a being contiguous, through the anodic bonding. As described above, since the Si device 130 is also fixed to the pressing member 125, these pressing member 125, Si device 130 and supporting member 127 are fixedly connected with each other, and forms a joined component (joined unit or joined element) 140. Detail of the Si device 130 will be described later.

The supporting member 127 is made of glass, and has a plate shape (rectangular plate shape). The supporting member 127 has the top end surface 127a and a base end surface 127b that is parallel to the top end surface 127a. As mentioned above, the top end surface 127a touches or is contiguous with the second main surface 130b of the Si device 130, and bonds to the second main surface 130b, then the top end surface 127a of the supporting member 127 supports or holds the Si device 130 from the base end side of the Si device 130. On the other hand, the base end surface 127b touches or is contiguous with an after-mentioned top end surface 161a of a base or seat 161.

In the pressure detecting system 120 having such configuration, when a top end surface 150a of the heater 150 receives the pressure (cylinder internal pressure) P in the base end side direction, the base end surface 150b of the heater 150 presses the pressure detecting system 120 toward the base end side, then the pressure detecting system 120 is pressed or compressed between the seat 161 and the heater 150. With this compression, the cylinder internal pressure P is detected. More specifically, the base end surface 150b of the heater 150 presses the top end member 121 of the pressure detecting system 120 toward the base end side. The top end member 121 presses the intermediate member 123 toward the base end side, and the intermediate member 123 presses the pressing member 125 toward the base end side. Further, the pressing member 125 presses the Si device 130 toward the base end side. On the other hand, since a position in the axis AX direction of the supporting member 127 is restricted on its base end side by the seat 161, the Si device 130 is compressed in the axis AX direction between the pressing member 125 and the supporting member 127. With this compression, resistance of a pressure-sensitive resistor 131 (described later), which is formed on the Si device 130, changes in accordance with the cylinder internal pressure P by piezoresistive effect, thereby detecting the cylinder internal pressure P which the heater 150 receives.

Next, a top end side structure of the glow plug with cylinder internal pressure sensor 100, which is located on the top end side of the pressure detecting system 120, will be explained (see FIGS. 2 and 3). As can be seen in the drawings, the heater 150 that serves as a heating element (or heat generator) of the glow plug is provided on the top end side of the pressure detecting system 120. The heater 150 has a stick or rod shape (more specifically, cylindrical column), and its top end surface 150a is a hemispherical surface, while the base end surface 150b is a plane surface.

The heater 150 is inserted into the top end side housing portion 113. Furthermore, a base end portion 150k of the heater 150 is inserted into the housing body 111. Then the base end surface 150b of this heater 150 touches or is contiguous with the pressure detecting system 120 (the top end surface 121a of the top end member 121). On the other hand, a top end side portion of the heater 150 protrudes from the housing 110 toward the top end side.

An outer cylinder or cylindrical-shaped outer casing 155 is provided on outer circumference of a middle section in the axis AX direction of the heater 150. A base end side portion of the outer cylinder 155 is inserted into the top end side housing portion 113, while a top end side portion of the outer cylinder 155 protrudes from the housing 110 toward the top end side. A base end portion 155k of the outer cylinder 155 is formed into a flange, and is secured between the housing body 111 and the top end side housing portion 113 through welding with the base end portion 155k sandwiched and supported between the housing body 111 and the top end side housing portion 113.

Figure 4:
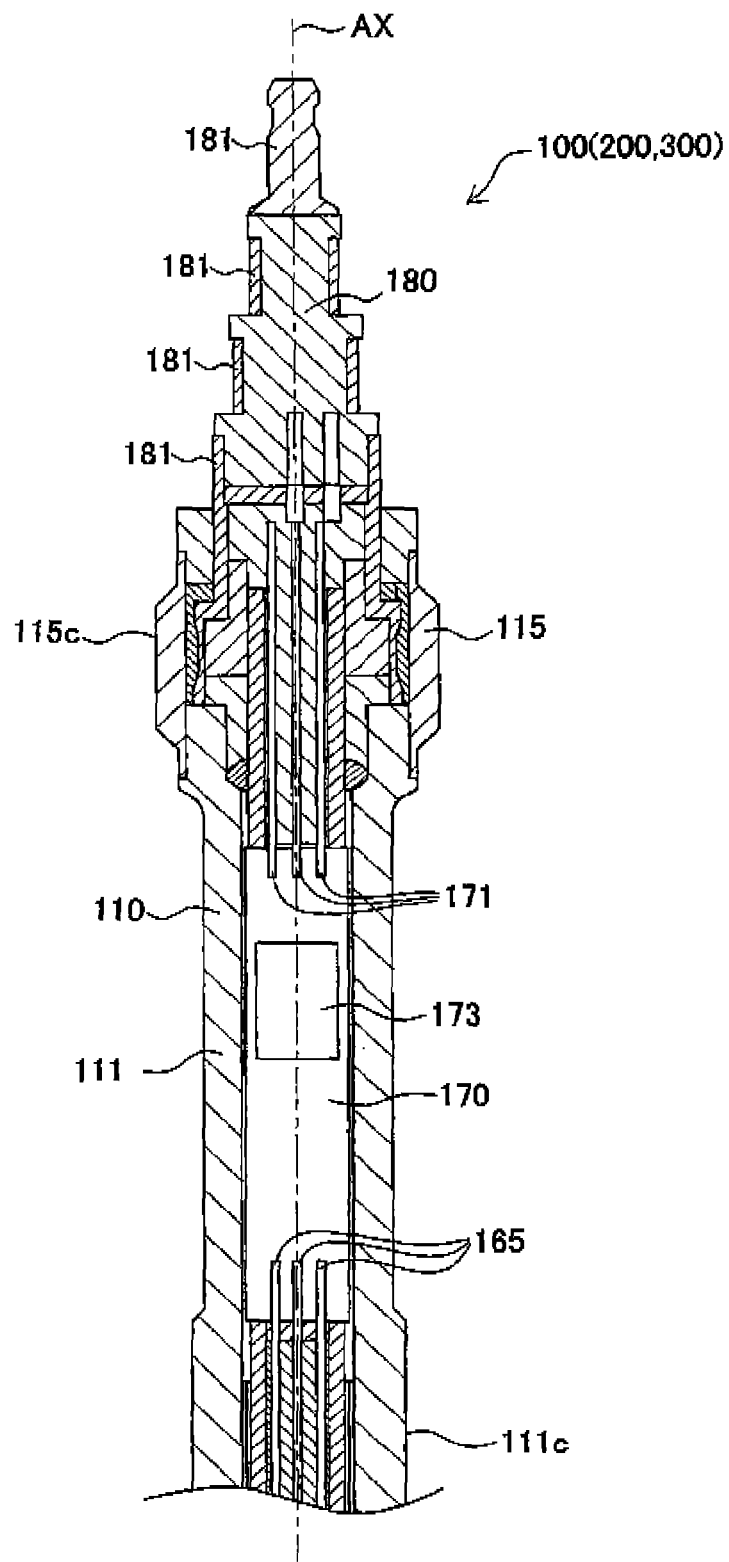
FIG. 4 is a sectional view showing a base end side of the glow plug with cylinder internal pressure sensor of embodiments 1, 2 and 3.

Next, a structure of the glow plug with cylinder internal pressure sensor 100, which is located on the base end side of the pressure detecting system 120, will be explained (see FIGS. 2 to 4). As can be seen in the drawings, the seat 161 is provided on the base end side of the pressure detecting system 120. In addition, a seat retainer 163 is provided on a base end side of the seat 161. The seat retainer 163 serves to fix or retain a position in the axis AX direction of the seat 161 on the base end side of the seat 161.

Moreover, three wires 165, 165, 165 are connected to the pressure detecting system 120. Each of these wires 165, 165, 165 extends from the pressure detecting system 120 toward the base end side and is connected to the wiring board (or circuit board) 170. Further, another wire (not shown) is connected to the heater 150, and extends toward the base end side and is connected to the circuit board 170.

The circuit board 170 is housed inside the housing body 111 of the housing 110. The circuit board 170 is provided with an electronic circuit 173 for processing an output signal from the pressure detecting system 120 (the Si device 130). As explained above, the wires 165 extending from the pressure detecting system 120 and the heater 150 are connected with the circuit board 170 on the top end side, while four wires 171, 171, 171 . . . (one of four wires is not shown) are connected with the circuit board 170 on the base end side. These wires 171, 171 . . . extend toward the base end side, and are connected to the external terminal portion 180.

The external terminal portion 180 positioned on the base end side of the housing 110, has four terminals 181, 181, 181, 181. As can be seen in the drawings, their sizes in the radial direction are different so that the closer to the base end side the terminal 181 is positioned, the smaller the size. That is, the size in the radial direction of the terminal 181 positioned on the base end side is smallest, and the size in the radial direction of the terminal 181 positioned on the top end side is largest. The wires 171, 171 . . . extending from the circuit board 170 are connected with the respective terminals 181, 181, . . . . Furthermore, each terminal 181 connects to an external control device (not shown) such as an ECU.

The glow plug with cylinder internal pressure sensor 100 is fixed to the internal combustion engine so that the top end side of the glow plug 100 is positioned in a combustion chamber. Then the heater 150 heats up through energization, and assists an engine start. Under this condition, when the cylinder internal pressure P in the combustion chamber is applied to the top end surface 150a of the heater 150, the heater 150 slightly varies or moves toward the base end side. Through this variation or movement, the cylinder internal pressure P is transmitted to the pressure detecting system 120, then the cylinder internal pressure P is detected.

Figure 6:
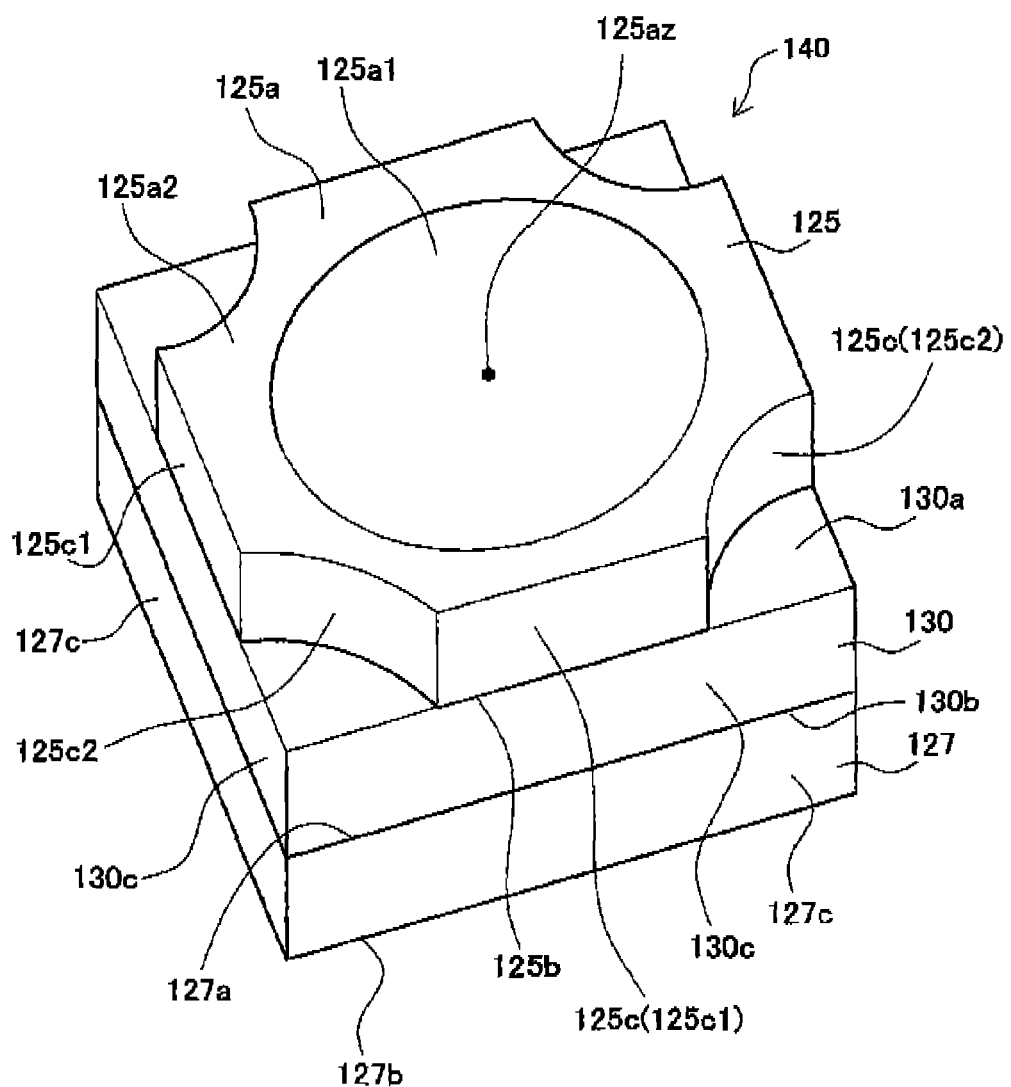
FIG. 6 is a perspective view showing a joined component formed from a Si device, a pressing member and a supporting member, of the glow plug with cylinder internal pressure sensor of embodiment 1.
Figure 7:
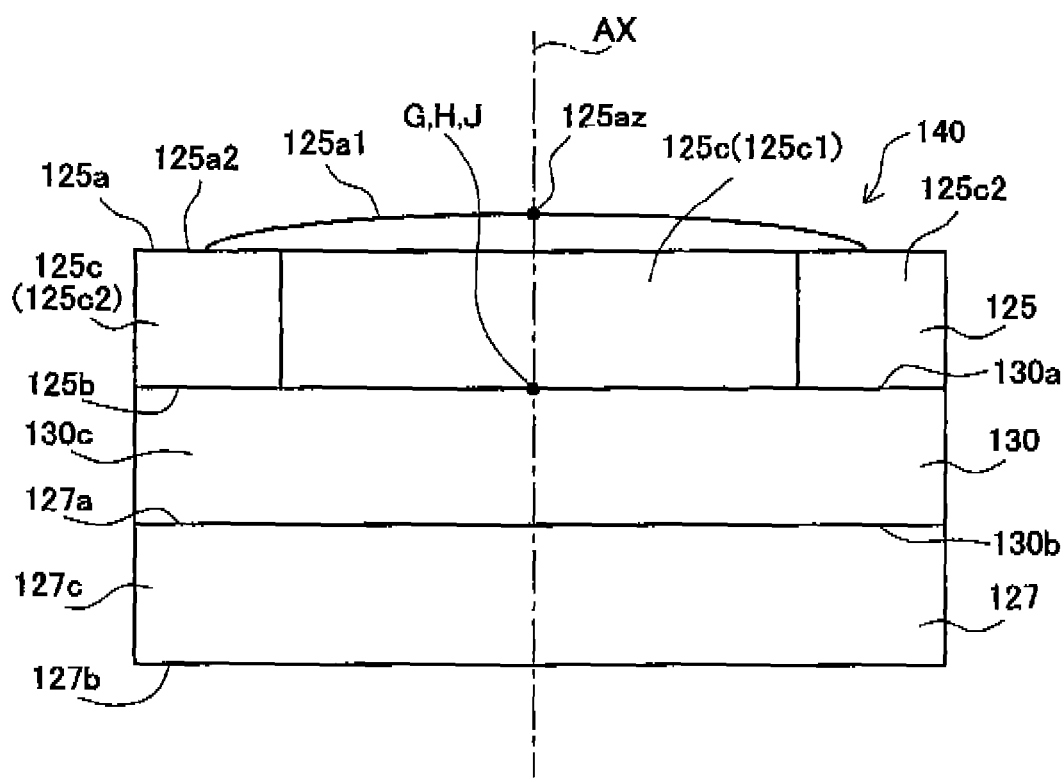
FIG. 7 is a side view showing the joined component formed from the Si device, the pressing member and the supporting member, of the glow plug with cylinder internal pressure sensor of embodiment 1.

Next, the joined component 140 formed by bonding the pressing member 125 and the supporting member 127 to the Si device 130, will be explained in detail. FIGS. 6 and 7 show the joined component 140. Here, in FIGS. 6 and 7, the upper side of the drawing is the top end side, and the lower side of the drawing is the base end side. As explained above, the base end surface 125b of the pressing member 125 is bonded to the first main surface 130a of the Si device 130 through the anodic bonding, while the top end surface 127a of the supporting member 127 is bonded to the second main surface 130b of the Si device 130 through the anodic bonding. With this, the joined component 140 formed by the three members is provided.

As described above, the Si device 130 has the first main surface 130a and the second main surface 130b that is parallel to the first main surface 130a, and further has four side surfaces 130c, 130c . . . which connect the first and second main surfaces 130a and 130b. The Si device 130 has a rectangular plate shape (more specifically, square plate shape). The Si device 130 can detect a stress occurring to the Si device itself by the cylinder internal pressure P that is an object of detection. This Si device 130 is an SOI substrate (Silicon On Insulator).

Figure 8:
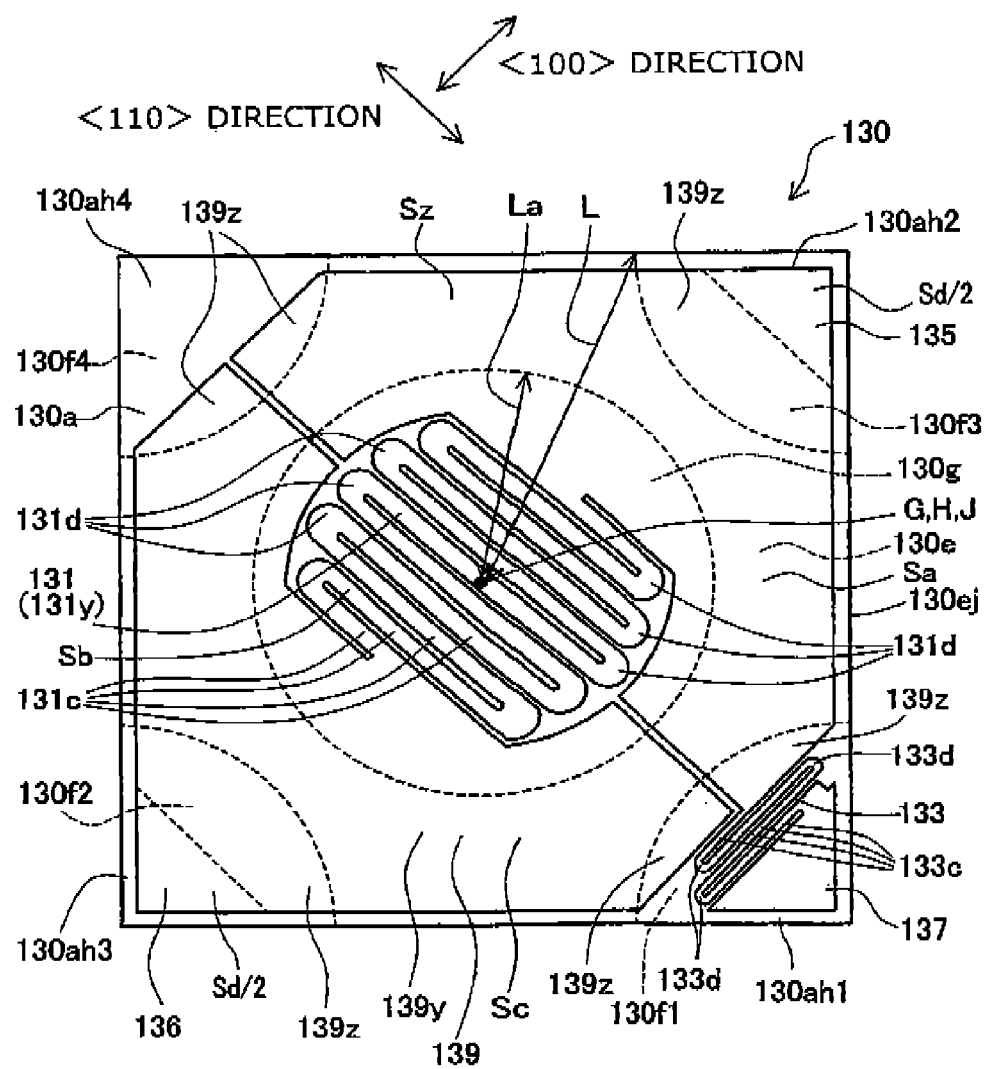
FIG. 8 is a plan view, viewed from a first main surface side of the Si device, of the glow plug with cylinder internal pressure sensor of embodiment 1.

FIG. 8 shows a plan view of the Si device 130, viewed from the first main surface 130a side of the Si device 130. Surface orientation (or crystal orientation) of the first main surface 130a of the Si device 130 is {110} plane (more specifically, (110) plane). On the first main surface 130a, two resistors; the pressure-sensitive resistor 131 and a temperature-sensitive resistor 133, are formed. These pressure-sensitive resistor 131 and temperature-sensitive resistor 133 are resistors that are formed simultaneously through the same process (the same diffusion process). Because of this, both resistance-temperature coefficients are substantially equal to each other. More specifically, a difference between both the resistance-temperature coefficients is nearly 50 ppm/° C. Further, these pressure-sensitive resistor 131 and temperature-sensitive resistor 133 are p-type semiconductors, and its impurity concentration Cp (1/cm$^3$) is, $0.6 \times 10^{18} \leq Cp \leq 1.4 \times 10^{18}$/cm$^3$, or $0.6 \times 10^{20} \leq Cp \leq 1.4 \times 10^{20}$/cm$^3$. More specifically, the impurity concentration Cp is $1.0 \times 10^{20}$/cm$^3$. With this, temperature-sensitivity characteristics of the resistors 131, 133 become smaller than or equal to 500 ppm/° C.

The pressure-sensitive resistor 131 is a resistor whose resistance changes or varies according to the cylinder internal pressure P by the piezoresistive effect. More specifically, resistance of the pressure-sensitive resistor 131 itself varies according to a pressing force applied from the pressing member 125. In addition to this resistance variation, resistance of the pressure-sensitive resistor 131 itself varies according to the temperature T of the Si device 130.

As seen in FIG. 8, the pressure-sensitive resistor 131 is formed at the middle on the first main surface 130a with pressure-sensitive sections 131c, 131c, . . . extending in <110> direction of the Si device 130 being a main section. That is, the pressure-sensitive resistor 131 is formed from a plurality of pressure-sensitive sections 131c, 131c, . . . and a plurality of direction turning sections 131d, 131d . . . . The pressure-sensitive sections 131c extend linearly in <110> direction, and these are arranged parallel to each other at regular intervals (or arranged at certain intervals). On the other hand, the direction turning sections 131d have an arc shape, and connect both ends of adjacent pressure-sensitive sections 131c, 131c. The serpentine-shaped (or meandering) pressure-sensitive resistor 131 is then formed on the first main surface 130a.

The serpentine-shaped pressure-sensitive resistor 131 is symmetrical about its center point G. The center G of the pressure-sensitive resistor 131 is positioned on a center H of the first main surface 130a. In the present embodiment, as shown in FIG. 8, the whole pressure-sensitive resistor 131 is placed within a bonded area 130e, where the base end surface 125b of the pressing member 125 and the first main surface 130a of the Si device 130 are bonded together (boundaries of the bonded area 130e are indicated by arc broken lines at four corners in FIG. 8). The bonded area 130e will be explained in more detail. The pressing member 125 is bonded to the first main surface 130a except for four corner sections 130ah1, 130ah2, 130ah3 and 130ah4 of the first main surface 130a. In other words, the bonded area 130e is the area except the four corner sections 130ah1, 130ah2, 130ah3 and 130ah4 of the first main surface 130a. A center J of the bonded area 130e is identical with the center G of the pressure-sensitive resistor 131 and the center H of the first main surface 130a. As mentioned above, the whole pressure-sensitive resistor 131 is placed within the bonded area 130e. And the pressure-sensitive resistor 131 as a whole corresponds to a first bonded section 131y of the present invention, and bonds to the pressing member 125.

On the other hand, as for the temperature-sensitive resistor 133, the resistor 133 is formed so that its own resistance changes or varies mainly according to the temperature T of the Si device 130. The temperature-sensitive resistor 133 is formed in the corner section 130ah1 on the first main surface 130a with temperature-sensitive sections 133c, 133c, . . . extending in <100> direction of the Si device 130 being a main section. That is, the temperature-sensitive resistor 133 is formed from a plurality of temperature-sensitive sections 133c, 133c, . . . and a plurality of direction turning sections 133d, 133d . . . . The temperature-sensitive sections 133c extend linearly in <100> direction, and these are arranged parallel to each other at regular intervals. On the other hand, the direction turning sections 133d have an arc shape, and connect both ends of adjacent linear temperature-sensitive sections 133c, 133c. The serpentine-shaped temperature-sensitive resistor 133 is then formed on the first main surface 130a. As explained above, the four corner sections 130ah1, 130ah2, 130ah3 and 130ah4 of the first main surface 130a are unbonded areas 130f1, 130f2, 130f3 and 130f4 (except the bonded area 130e), where the pressing member 125 is not bonded to the first main surface 130a of the Si device 130. Thus, the temperature-sensitive resistor 133 is placed in the unbonded area 130f1 on the first main surface 130a.

Since the temperature-sensitive resistor 133 is placed in the corner section as explained above, the temperature-sensitive resistor 133 is less susceptible to the pressing force (cylinder internal pressure P) by the pressing member 125. This will be explained in more detail. A variation (rate of change) of the resistance of the temperature-sensitive resistor 133 occurring according to a change of the pressure (cylinder internal pressure) P is extremely small (in the present embodiment 1, it is 1/240), as compared with a variation (rate of change) of the resistance of the pressure-sensitive resistor 131 occurring according to the change of the pressure (cylinder internal pressure) P.

The Si device 130 is provided with three triangular terminal pads 135, 136 and 137 which are respectively formed in the three corner sections 130ah2, 130ah3 and 130ah1 on the first main surface 130a. The terminal pad 135 of these terminal pads is a common terminal pad, i.e., the terminal pad 135 is electrically connected to one end of the pressure-sensitive resistor 131 through a joining (or bonding) assist pattern (or joining subsidiary pattern) 139 (described later), and also electrically connected to one end of the temperature-sensitive resistor 133 through the joining assist pattern 139. The terminal pad 136 is electrically connected to the other end of the pressure-sensitive resistor 131 through the joining assist pattern 139. The terminal pad 137 is electrically connected to the other end of the temperature-sensitive resistor 133.

The Si device 130 has the joining assist pattern 139 on the first main surface 130a. This joining assist pattern 139 is a pattern that is formed simultaneously through the same process (the same diffusion process) as the pressure-sensitive resistor 131 and the temperature-sensitive resistor 133, and formed of the same material as the pressure-sensitive resistor 131 and the temperature-sensitive resistor 133.

The joining assist pattern 139 is formed entirely on the first main surface 130a except for around the four corner sections 130ah1, 130ah2, 130ah3 and 130ah4 also except for the area where the pressure-sensitive resistor 131 is formed. The joining assist pattern 139 has a second bonded section 139y and unhanded sections 139z. The second bonded section 139y is situated in the bonded area 130e and bonds to the pressing member 125, then serves to increase a join area (or bonding area) between the Si device 130 and the pressing member 125. On the other hand, the unbonded sections 139z are situated in the unbonded areas 130f1, 130f2, 130f3 and 130f4 and do not bond to the pressing member 125. The joining assist pattern 139 is connected to the pressure-sensitive resistor 131. The second bonded section 139y of the joining assist pattern 139 is situated around the pressure-sensitive resistor 131 so that the second bonded section 139y surrounds the pressure-sensitive resistor 131.

Here, when an area of the whole bonded area 130e is Sa ($mm^2$), an area of the pressure-sensitive resistor 131 (the first bonded section 131y) is Sb ($mm^2$), and an area of the second bonded section 139y of the joining assist pattern 139 is Sc ($mm^2$), this Si device 130 satisfies a relationship of $Sb+Sc \geqq 0.9 \times Sa$. More specifically, in the present embodiment 1, the area Sa of the whole bonded area $130e = 2.39$ ($mm^2$), the area Sb of the pressure-sensitive resistor 131 (the first bonded section $131y) = 0.30$ ($mm^2$), and the area Sc of the second bonded section 139y of the joining assist pattern $139 = 2.03$ ($mm^2$).

Further, when an area of the first main surface 130a is Sz ($mm^2$) and a total area of the four corner openings is Sd ($mm^2$), the Si device 130 satisfies a relationship of $Sd \leqq 0.3 \times Sz$, i.e. $Sa \geqq 0.7 \times Sz$. More specifically, in the present embodiment 1, the area Sz of the first main surface $130a = 3.24$ ($mm^2$), and the total area Sd of the four corner openings $= 0.85$ ($mm^2$).

Moreover, when a maximum distance from the center J of the bonded area 130e to an outer circumferential edge 130ej of the bonded area 130e is L (mm), an area where a distance La (mm) from its center J satisfies a relationship of $La \leqq 0.6 \times L$ is a join central area 130g. In the present embodiment 1, the whole pressure-sensitive resistor 131 is placed within this join central area 130g.

As explained above, in the glow plug with cylinder internal pressure sensor 100 of the present embodiment 1, since the joining assist pattern 139 is formed on the Si device 130, the Si device 130 is bonded to the pressing member 125 by not only the bonding of the pressure-sensitive resistor 131 (the first bonded section 131y) but also the bonding of the second bonded section 139y of the joining assist pattern 139 through the anodic bonding. Thus, as compared with the conventional device, the join area between the Si device 130 and the pressing member 125 can be increased by a join area between the second bonded section 139y and the pressing member 125. As a consequence, this can enhance a connection strength between the Si device 130 and the pressing member 125 as compared with the conventional device, then reliability of the joining between the Si device 130 and the pressing member 125 can be improved.

In particular, in the present embodiment 1, the Si device 130 satisfies the relationship of $Sb+Sc \geqq 0.9 \times Sa$, as described above. That is to say, a proportion of the join area, which directly pertains to the bonding, to the whole bonded area 130e between the Si device 130 and the pressing member 125 is set to large proportion of 90% or more. Hence, the connection strength between the Si device 130 and the pressing member 125 can be especially increased, and the reliability of the joining between the Si device 130 and the pressing member 125 can be especially improved.

Further, in the present embodiment 1, the Si device 130 satisfies the relationship of $Sd \leqq 0.3 \times Sz$. That is to say, a proportion of the total area Sd of the four corner openings is set to be smaller than or equal to 30% of the area Sz of the first main surface 130a. It is therefore possible to reduce the unbonded areas 130f1, 130f2, 130f3 and 130f4 except the bonded area 130e. Conversely, the Si device 130 satisfies the relationship of Sa≧0.7×Sz. That is to say, a proportion of the area Sa of the bonded area 130e is set to be greater than or equal to 70% of the area Sz of the first main surface 130a. Consequently, it is possible to gain the connection strength between the Si device 130 and the pressing member 125, then the reliability of the joining between the Si device 130 and the pressing member 125 can be improved.

In the present embodiment 1, the pressure-sensitive resistor 131 and the joining assist pattern 139 are electrically connected to each other. Because of this, when the Si device 130 and the pressing member 125 are joined together through the anodic bonding, by connecting an anodic electrode of anodic bonding system and applying a voltage of the anodic electrode to one of the pressure-sensitive resistor 131 and the joining assist pattern 139, the voltage is also applied to the other. That is, by applying the voltage of the anodic electrode to either of the pressure-sensitive resistor 131 and the joining assist pattern 139, the anodic bonding of the Si device 130 and the pressing member 125 can be achieved easily and surely. Thus the glow plug with cylinder internal pressure sensor 100 having high reliability of the joining between the Si device 130 and the pressing member 125 can be provided.

In the present embodiment 1, the pressure-sensitive resistor 131 as a whole is the first bonded section 131y, and the whole pressure-sensitive resistor 131 is placed within the bonded area 130e. With this configuration and arrangement, since the whole pressure-sensitive resistor 131 is pressed by the pressing member 125, detection sensitivity of the pressure-sensitive resistor 131 for the cylinder internal pressure P becomes especially high. In addition, because the pressure-sensitive resistor 131 as a whole is bonded to the pressing member 125, the join area between the Si device 130 and the pressing member 125 can be increased, as compared with a case in which only a part of the pressure-sensitive resistor 131 is bonded to the pressing member 125. Therefore, this can further enhance the connection strength between the Si device 130 and the pressing member 125, then the reliability of the joining between the Si device 130 and the pressing member 125 can be further improved.

Additionally, in the present embodiment 1, the pressure-sensitive resistor 131 is surrounded with the second bonded section 139y of the joining assist pattern 139. This arrangement can gain the connection strength between the Si device 130 and the pressing member 125 and increase the reliability of the joining between the Si device 130 and the pressing member 125 while improving the detection sensitivity of the pressure-sensitive resistor 131 for the cylinder internal pressure P.

In the present embodiment 1, the whole pressure-sensitive resistor 131 is placed within the join central area 130g where the distance La (mm) from its center J satisfies the relationship of La≦0.6×L, of the bonded area 130e. With this arrangement, as compared with an outside area of the join central area 130g, deviation of magnitude of the stress arising upon receiving an offset load is less apt to occur in the join central area 130g. Thus, by placing the whole pressure-sensitive resistor 131 within the join central area 130g, variations in resistance change is less apt to occur. In addition, With this arrangement, even when a load pulsating or oscillating in a lateral direction is applied to the pressing member 125, the pressure-sensitive resistor 131 is less susceptible to this load, and the magnitude of the resistance change occurring to the pressure-sensitive resistor 131 is substantially unaffected by this load. Hence, the cylinder internal pressure P can be detected more accurately.

In the present embodiment 1, the pressure-sensitive resistor 131 is symmetrical about its center point G, and the center point G is identical with the center J of the bonded area 130e. With this arrangement, even if an offset load component exists in the load acting on the pressing member 125 by the cylinder internal pressure P, the pressure-sensitive resistor 131 is especially less susceptible to the offset load, and the magnitude of the resistance change occurring to the pressure-sensitive resistor 131 is substantially unaffected by the offset load. Also, even when the load pulsating or oscillating in the lateral direction is applied to the pressing member 125, the pressure-sensitive resistor 131 is especially less susceptible to this load, and the magnitude of the resistance change occurring to the pressure-sensitive resistor 131 is substantially unaffected by this load. Hence, the cylinder internal pressure P can be detected even more accurately.

In the present embodiment 1, the Si device 130 is a compression type Si device, in which the surface orientation of the first main surface 130a of the Si device 130 is {110} plane. Further, the pressure-sensitive resistor 131 has the serpentine-shape having the plurality of pressure-sensitive sections 131c extending in <110> direction of the Si device 130 and the plurality of direction turning sections 131d connecting both ends of adjacent linear pressure-sensitive sections 131c, 131c. Moreover, the shape of the direction turning section is the arc shape. With this configuration and arrangement, the pressure-sensitive resistor 131 produces the resistance change according to the cylinder internal pressure P with high sensitivity in the pressure-sensitive sections 131c extending in <110> direction. In addition, since the direction turning section 131d also has a component that extends in <110> direction, these direction turning sections 131d can also produce the resistance change according to the cylinder internal pressure P. Consequently, the pressure-sensitive resistor 131 as a whole can produce the resistance change according to the cylinder internal pressure P by a large amount.

Embodiment 2

Next, an embodiment 2 of the present invention will be explained with reference to the drawings. With regard to a glow plug 200 of the embodiment 2 and an after-mentioned glow plug 300 of an embodiment 3, configurations of pressing members 225, 325 (see FIG. 9) of a joined component 240 and a pressure-sensitive resistor 231 etc. formed in a Si device 230 (see FIGS. 12 and 13) are different from those of the pressing member 125 and the pressure-sensitive resistor 131 etc. of the Si device 130 of the embodiment 1. However, the other portions or members are the same as the embodiment 1. Thus, the different portions will be mainly explained here. The same portions (members) as the embodiment 1 are indicated by the same reference signs, and the same description are omitted or will be briefly explained. Therefore, FIG. 1 is also the outward appearance of glow plug with cylinder internal pressure sensors (pressure detection apparatus) 200, 300 of the embodiments 2, 3. Further, FIGS. 2 to 4 and 9 show longitudinal cross sections of the glow plug with cylinder internal pressure sensor 200, 300.

Figure 9:
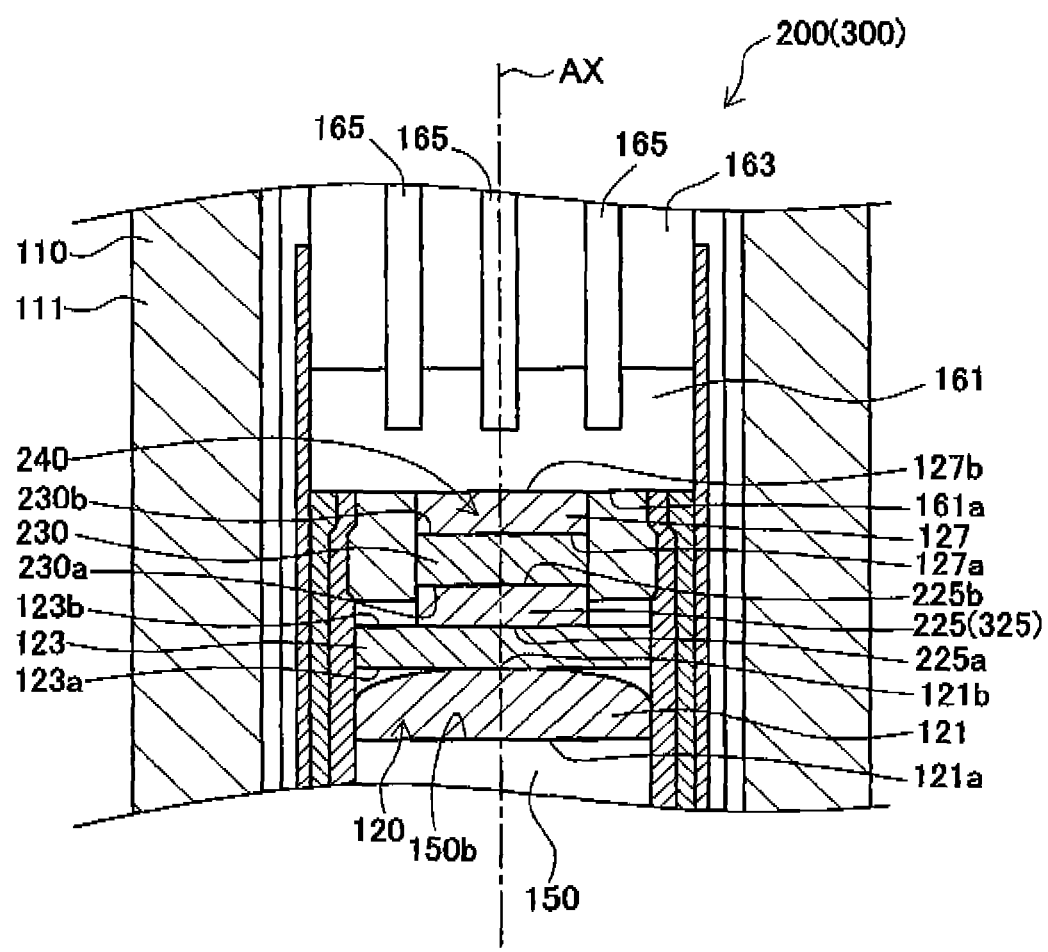
FIG. 9 is a locally enlarged sectional view showing the pressure detecting system and its surrounding components, of the glow plug with cylinder internal pressure sensor of embodiment 2.

As shown in FIG. 9, the pressure detecting system 120 built inside the housing body 111 has the top end member 121, the intermediate member 123, the pressing member 225, the Si device 230, and the supporting member 127, then these are placed in this order from top end side toward base end side (see FIGS. 3 and 9).

In the embodiment 1, the top end surface 125a of the pressing member 125 has the dome-shaped rounded surface. In the embodiment 2, the pressing member 225 is made principally of glass, which is the same as the pressing member 125 of the embodiment 1. However, a shape of the pressing member 225 differs from that of the pressing member 125. That is, as can be seen in FIG. 9 (cf. FIG. 5), the pressing member 225 has a top end surface 225a and a base end surface 225b that is parallel to the top end surface 225a, and is formed into a plate. The top end surface 225a touches or is contiguous with the base end surface 123b of the intermediate member 123. On the other hand, the base end surface 225b touches or is contiguous with a first main surface 230a (described next) of the Si device 230, which is a top end surface of the Si device 230. More specifically, these base end surface 225b of the pressing member 225 and first main surface 230a of the Si device 230 are joined or bonded together, with the both surfaces 225b and 230a being contiguous, through anodic bonding. Detail of the pressing member 225 will be described later.

Figure 10:
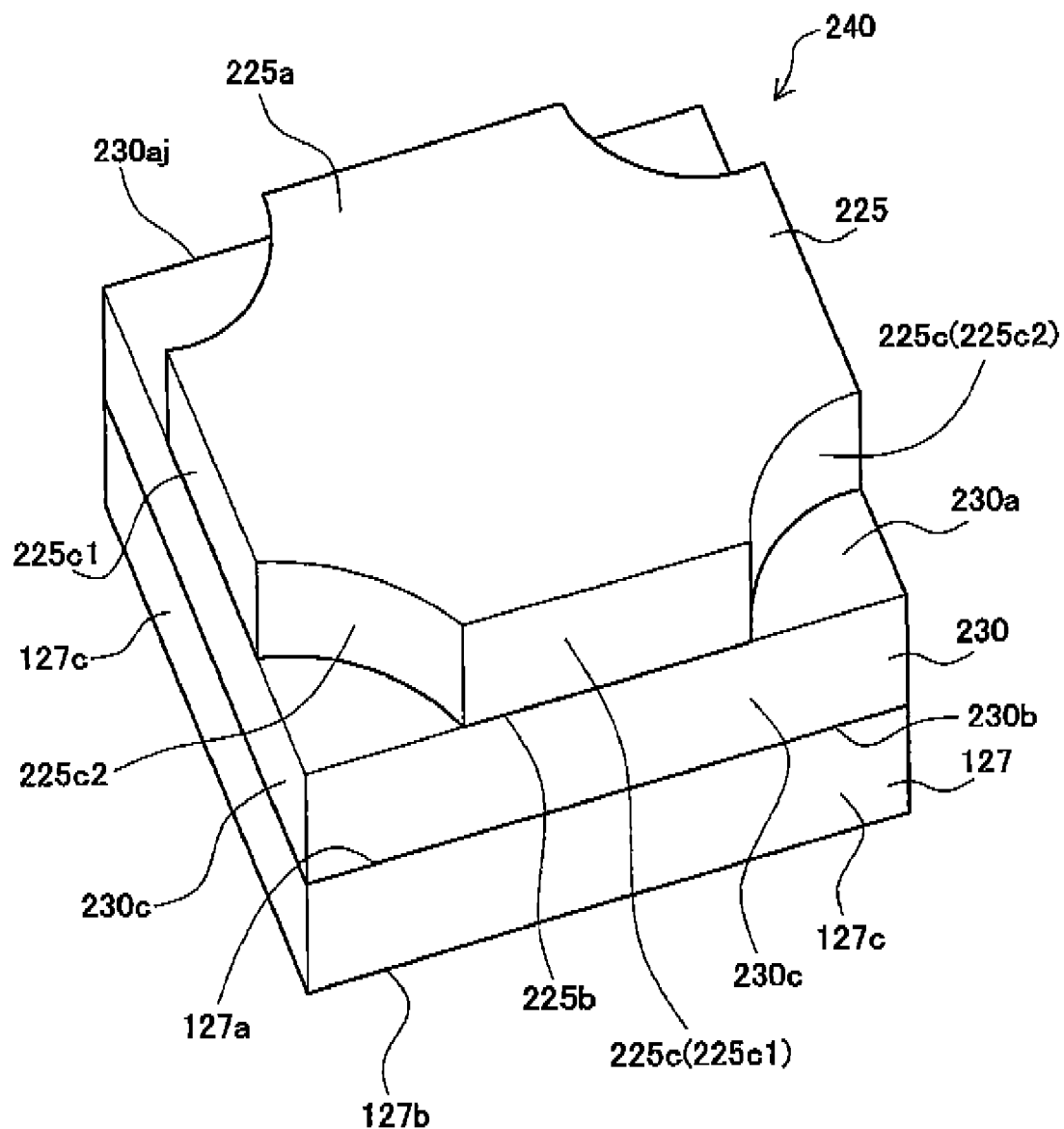
FIG. 10 is a perspective view showing a joined component formed from a Si device, a pressing member and a supporting member, of the glow plug with cylinder internal pressure sensor of embodiment 2.
Figure 11:
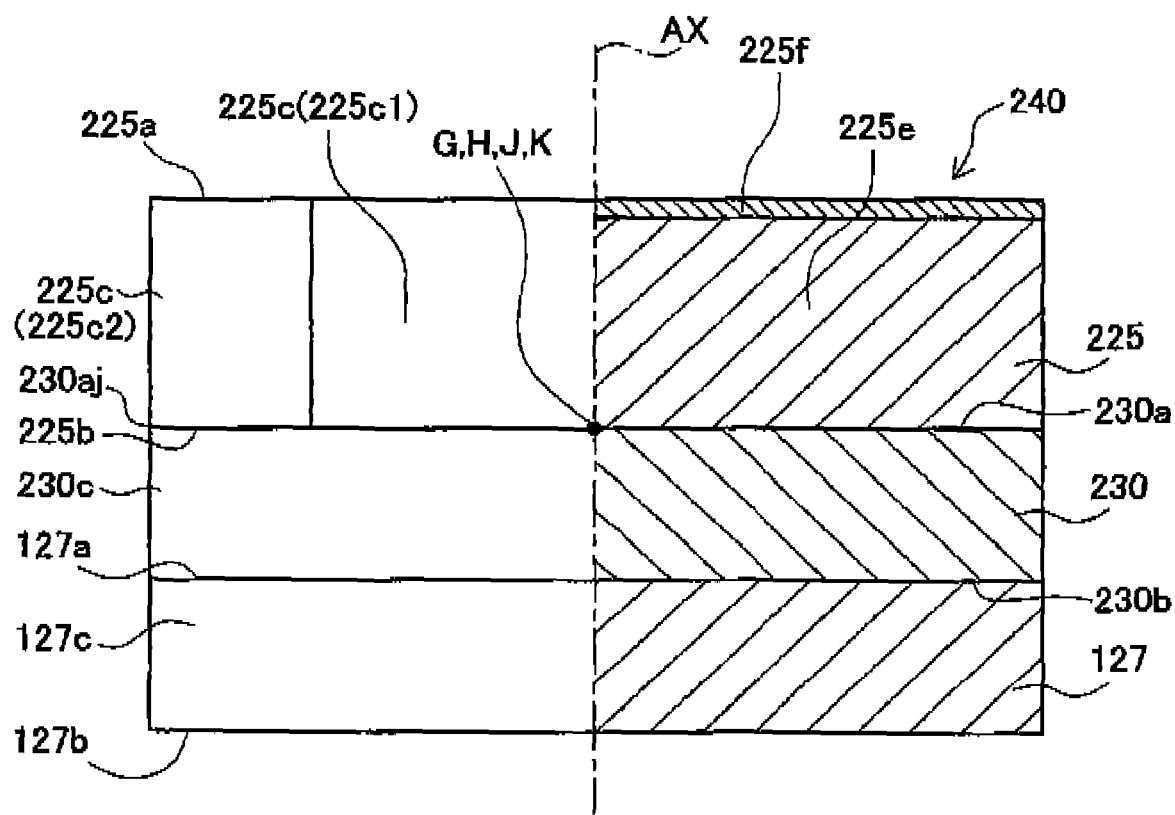
FIG. 11 is a side view showing the joined component formed from the Si device, the pressing member and the supporting member, of the glow plug with cylinder internal pressure sensor of embodiment 2.

Next, the joined component 240 formed by bonding the pressing member 225 and the supporting member 127 to the Si device 230, will be explained in detail. FIGS. 10 and 11 show the joined component 240. As explained above, the base end surface 225b of the pressing member 225 is bonded to the first main surface 230a of the Si device 230, while the top end surface 127a of the supporting member 127 is bonded to the second main surface 230b of the Si device 230. With this, the joined component 240 formed by the three members is provided.

As described above, the Si device 230 has the first main surface 230a and the second main surface 230b that is parallel to the first main surface 230a, and further has four side surfaces 230c, 230c . . . which connect the first and second main surfaces 230a and 230b. The Si device 230 has a rectangular plate shape (more specifically, square plate shape). The Si device 230 can detect a stress change occurring to the Si device itself by the cylinder internal pressure P that is an object of detection. This Si device 230 is an SOI substrate (Silicon On Insulator).

Figure 12:
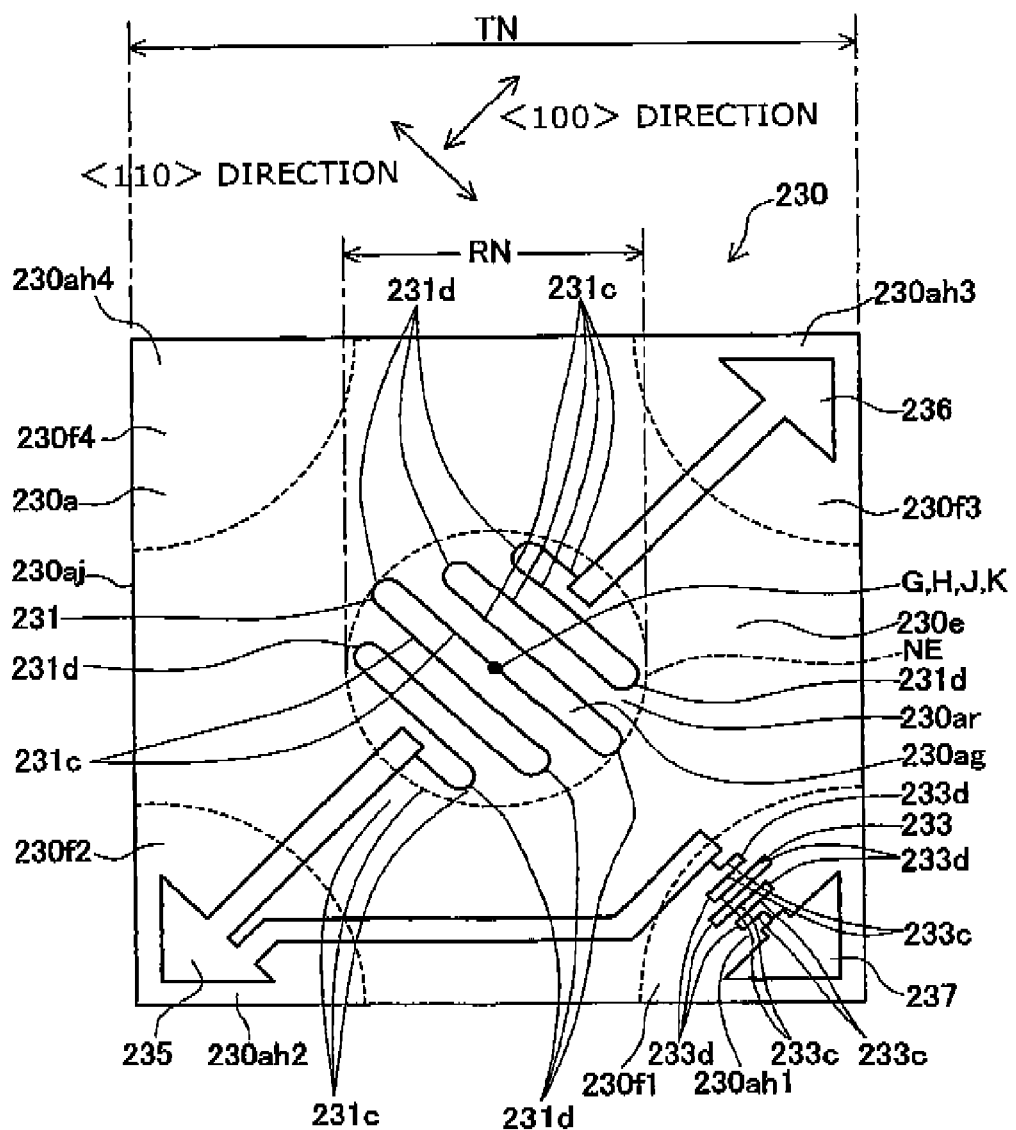
FIG. 12 is a plan view, viewed from a first main surface side of the Si device, of the glow plug with cylinder internal pressure sensor of embodiment 2.
Figure 13:
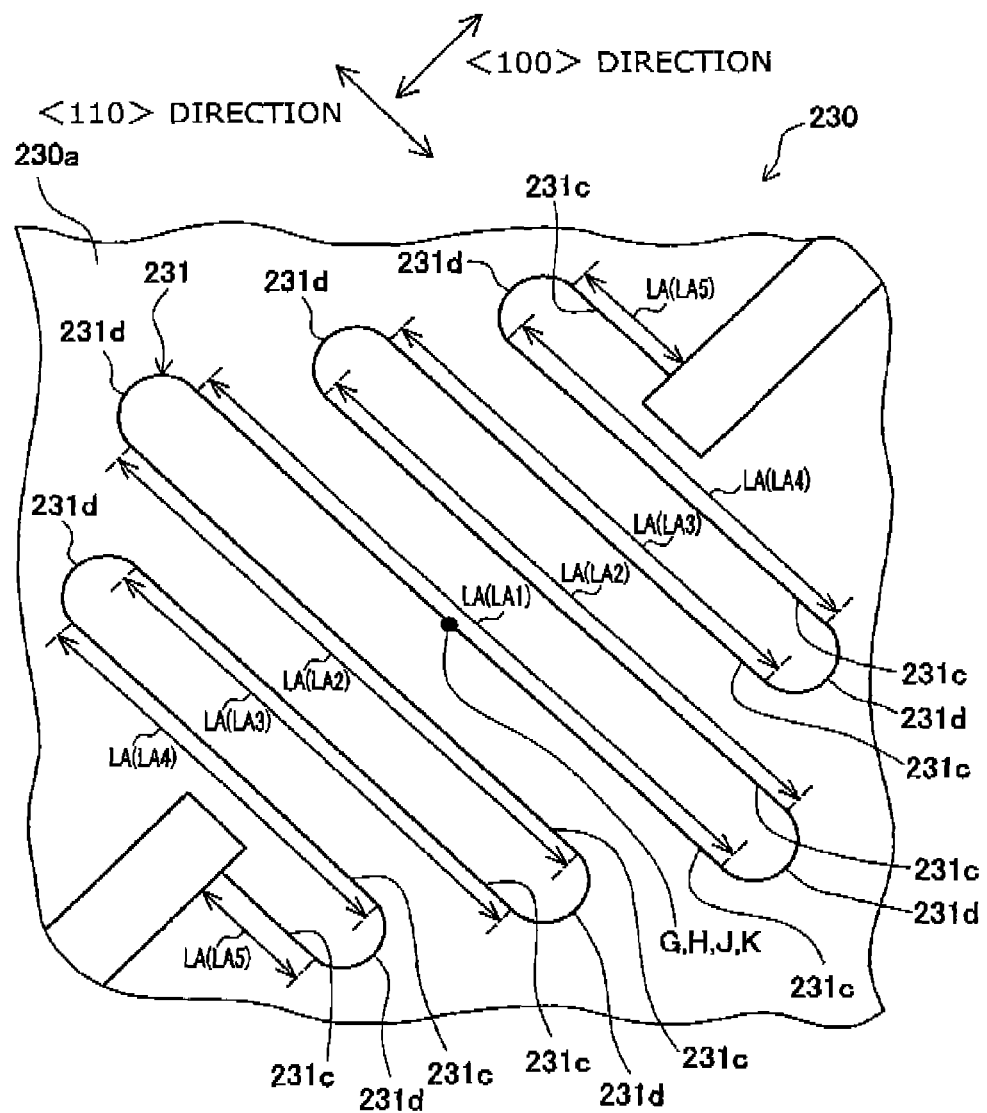
FIG. 13 is a locally enlarged view showing a pressure-sensitive resistor on the first main surface side of the Si device, of the glow plug with cylinder internal pressure sensor of embodiment 2.

FIG. 12 shows a plan view of the Si device 230, viewed from the first main surface 230a side of the Si device 230. FIG. 13 is a locally enlarged view showing the pressure-sensitive resistor 231. Surface orientation of the first main surface 230a of the Si device 230 is {110} plane (more specifically, (110) plane). On the first main surface 230a, two resistors; the pressure-sensitive resistor 231 and a temperature-sensitive resistor 233, are formed. These pressure-sensitive resistor 231 and temperature-sensitive resistor 233 are resistors that are formed simultaneously through the same diffusion process. Because of this, both resistance-temperature coefficients are substantially equal to each other. More specifically, a difference between both the resistance-temperature coefficients is nearly 50 ppm/° C. Further, these pressure-sensitive resistor 231 and temperature-sensitive resistor 233 are p-type semiconductors, and its impurity concentration Cp (1/cm$^3$) is, $0.6 \times 10^{18} \leq Cp \leq 1.4 \times 10^{18}$/cm$^3$, or $0.6 \times 10^{20} \leq C \leq 1.4 \times 10^{20}$/cm$^3$. More specifically, the impurity concentration Cp is $1.0 \times 10^{20}$/cm$^3$. With this, temperature-sensitivity characteristics of the resistors 231, 233 become smaller than or equal to 500 ppm/° C.

The pressure-sensitive resistor 231 is a resistor whose first resistance changes or varies according to the cylinder internal pressure P by the piezoresistive effect. More specifically, the first resistance of the pressure-sensitive resistor 231 itself varies according to the pressing force applied from the pressing member 225. In addition to this resistance variation, the first resistance of the pressure-sensitive resistor 231 itself varies according to the temperature T of the Si device 230.

As seen in FIGS. 12 and 13, the pressure-sensitive resistor 231 is formed at a middle area 230ag on the first main surface 230a with pressure-sensitive sections 231c, 231c, . . . extending in <110> direction of the Si device 230 being a main section. That is, the pressure-sensitive resistor 231 is formed from a plurality of pressure-sensitive sections 231c, 231c, . . . and a plurality of direction turning sections 231d, 231d . . . . The pressure-sensitive sections 231c extend linearly in <110> direction, and these are arranged parallel to each other at regular intervals. On the other hand, the direction turning sections 231d have an arc shape, and connect both ends of adjacent pressure-sensitive sections 231c, 231c. The serpentine-shaped pressure-sensitive resistor 231 is then formed on the first main surface 230a.

This serpentine pressure-sensitive resistor 231 is symmetrical about a center K of a pressure-sensitive part area 230ar (in the present embodiment, it is a circular area indicated by a broken line in the middle in FIG. 12) where the pressure-sensitive resistor 231 is formed. A center G of the pressure-sensitive resistor 231 (the center K of the pressure-sensitive part area 230ar) is positioned on a center H of the first main surface 230a.

As can be seen in FIGS. 12 and 13, with respect to the pressure-sensitive sections 231c forming the pressure-sensitive resistor 231, their sizes (lengths) LA in <110> direction are set as shown in the drawings. That is, the length of the outermost pressure-sensitive section 231c in <100> direction from the center K of the pressure-sensitive part area 230ar is shortest, and the length of the pressure-sensitive section 231c arranged in the middle in <100> direction is longest. In other words, the farther in <100> direction from the center K of the pressure-sensitive part area 230ar the position of the pressure-sensitive section 231c is, the smaller the length LA in <110> direction of the pressure-sensitive section 231c. More specifically, as shown in FIG. 13, as compared with a length LA1 of the pressure-sensitive section 231c positioned on the center K of the pressure-sensitive part area 230ar, lengths LA2 of the neighboring pressure-sensitive sections 231c, 231c are smaller. Further, as compared with the lengths LA2, lengths LA3 of the neighboring pressure-sensitive sections 231c, 231c are smaller. Likewise, lengths LA4 of the neighboring pressure-sensitive sections 231c, 231c are smaller than the lengths LA3. Then, lengths LA5 of both ends of the pressure-sensitive resistor 231, i.e., lengths LA5 of the outermost pressure-sensitive sections 231c in <100> direction, are smallest.

In addition to the above, as seen in FIG. 12, a diameter RN of a virtual circle NE (in the present embodiment, it is also an outer circumferential edge of the pressure-sensitive part area 230ar) in which the pressure-sensitive resistor 231 is inscribed is set to one-half (½) or less of a length TN of an edge (shorter edge) of the first main surface 230a. In the present embodiment, the diameter RN of the virtual circle NE is 0.9 mm, the edge length TN of the first main surface 230a is 1.8 mm.

Moreover, the whole pressure-sensitive resistor 231 is placed within a bonded area 230e, where the base end surface 225b of the pressing member 225 and the first main surface 230a of the Si device 230 are bonded together (boundaries of the bonded area 230e are indicated by broken lines at four corners in FIG. 12). More specifically, the pressing member 225 is bonded to the first main surface 230a except for four corner sections 230ah1, 230ah2, 230ah3 and 230ah4 of the first main surface 230a with the pressing member 225 reaching up to four outer circumferential edges 230aj which surround or define the first main surface 230a. In other words, the bonded area 230e is the area except the four corner sections 230ah1, 230ah2, 230ah3 and 230ah4 of the first main surface 230a. A center J of the bonded area 230e is identical with the center G of the pressure-sensitive resistor 231, the center K of the pressure-sensitive part area 230ar and the center H of the first main surface 230a.

On the other hand, as for the temperature-sensitive resistor 233, the resistor 233 is formed so that its own second resistance changes or varies mainly according to the temperature T of the Si device 230. The temperature-sensitive resistor 233 is formed in the corner section 230ah1 on the first main surface 230a with temperature-sensitive sections 233c, 233c, . . . extending in <100> direction of the Si device 230 being a main section. That is, the temperature-sensitive resistor 233 is formed from a plurality of temperature-sensitive sections 233c, 233c, . . . and a plurality of direction turning sections 233d, 233d . . . . The temperature-sensitive sections 233c extend linearly in <100> direction, and these are arranged parallel to each other at regular intervals. On the other hand, the direction turning sections 233d have an arc shape, and connect both ends of adjacent linear temperature-sensitive sections 233c, 233c. The serpentine-shaped temperature-sensitive resistor 233 is then formed on the first main surface 230a. As explained above, the four corner sections 230ah1, 230ah2, 230ah3 and 230ah4 of the first main surface 230a are unbonded areas 230f1, 230f2, 230f3 and 230f4, where the pressing member 225 is not bonded to the first main surface 230a of the Si device 230. Thus, the temperature-sensitive resistor 233 is placed in the unbonded area 230f1 (the corner section 230ah1) on the first main surface 230a.

Since the temperature-sensitive resistor 233 is placed in the corner section as explained above, the temperature-sensitive resistor 233 is less susceptible to the pressing force (cylinder internal pressure P) by the pressing member 225. This will be explained in more detail. A variation (rate of change) of the second resistance of the temperature-sensitive resistor 233 occurring according to a change of the pressure (cylinder internal pressure) P is extremely small (in the present embodiment 1, it is 1/240), as compared with a variation (rate of change) of the first resistance of the pressure-sensitive resistor 231 occurring according to the change of the pressure (cylinder internal pressure) P.

The Si device 230 is provided with three triangular terminal pads 235, 236 and 237 which are respectively formed in the three corner sections 230ah2, 230ah3 and 230ah1 on the first main surface 230a. The terminal pad 235 is a common terminal pad, i.e., the terminal pad 235 is electrically connected to one end of the pressure-sensitive resistor 231, and also electrically connected to one end of the temperature-sensitive resistor 233. The terminal pad 236 is electrically connected to the other end of the pressure-sensitive resistor 231. The terminal pad 237 is electrically connected to the other end of the temperature-sensitive resistor 233.

Next, the pressing member 225 will be explained (see FIGS. 10, 11 and 14). The pressing member 225 has the top end surface 225a of the plane surface and the base end surface 225b that is parallel to the top end surface 225a, and further has eight side surfaces 225c, 225c, . . . which connect the top end surface 225a and the base end surface 225b. Among these eight side surfaces 225c, four side surfaces 225c1, 225c1, . . . have a plane surface. The other four side surfaces 225c2 have a curved surface that is the same surface as an inner circumferential surface of a quarter cylinder. The four side surfaces 225c1 of the plane surface are formed so that the surface 225c1 and the side surface 230c of the Si device 230 are flush with each other. On the other hand, the four side surfaces 225c2 of the curved surface are located in the four corners of the Si device 230.

Figure 14:
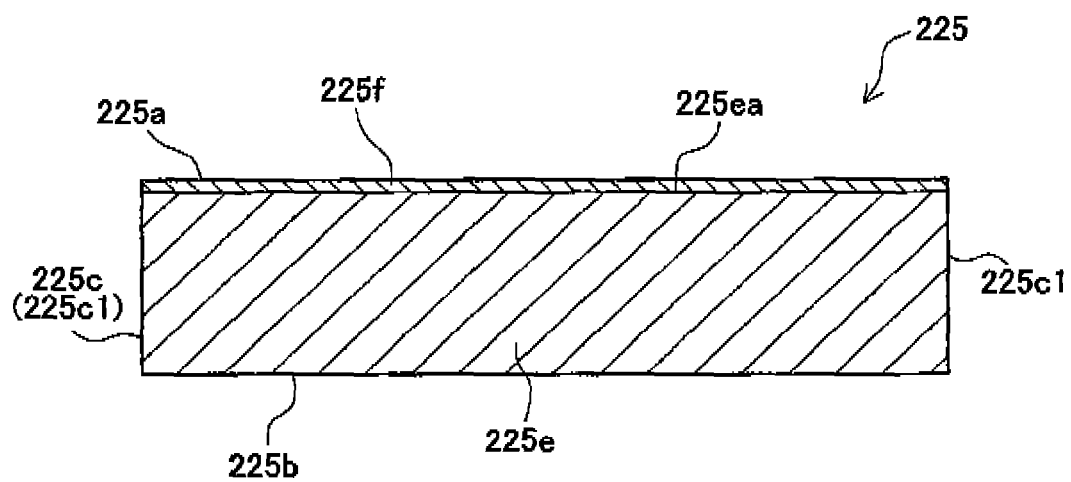
FIG. 14 is a sectional view of the pressing member, of the glow plug with cylinder internal pressure sensor of embodiment 2.

As seen in FIG. 14 that shows a longitudinal cross section of the pressing member 225, the pressing member 225 has a plate-shaped glass member 225e that is made of glass and a metal layer (metal member) 225f which adheres or is bonded to a top end side surface 225ea of the glass member 225e and forms the top end surface 225a of the pressing member 225. Here, in the embodiment 2, this metal layer 225f is provided on the glass member 225e for increasing durability of the glass member 225e. However, the whole pressing member 225 could be made of glass without being provided with the metal layer 225f.

The supporting member 127 has a rectangular plate shape (square plate shape). More specifically, as shown in FIGS. 10 and 11, the supporting member 127 has the top end surface 127a and the base end surface 127b that is parallel to the top end surface 127a, and further has four side surfaces 127c, 127c, . . . which connect the top end surface 127a and the base end surface 127b. Sizes of these top end surface 127a and base end surface 127b are the same as those of the first main surface 230a and the second main surface 230b. Further, the four side surfaces 127c are formed so that the side surface 127c and the side surface 230c of the Si device 230 are flush with each other.

As explained above, in the glow plug with cylinder internal pressure sensor 200 of the present embodiment, the Si device 230 has the rectangular plate shape having the first main surface 230a and the second main surface 230b. And the pressing member 225 is bonded to the first main surface 230a except for the four corner sections 230ah1, 230ah2, 230ah3 and 230ah4 of the first main surface 230a with the pressing member 225 reaching up to the four outer circumferential edges 230aj. With this configuration, as compared with the conventional pressure sensor, even if the offset load component and/or the load pulsating or oscillating in the lateral direction exist in the load acting on the pressing member 225 by the cylinder internal pressure P, the pressure-sensitive resistor 231 of the Si device 230 is less susceptible to these loads and the magnitude of the resistance change occurring to the pressure-sensitive resistor 231 is substantially unaffected by these loads. Also, even when the load pulsating or oscillating in the lateral direction is applied to the pressing member 225, the pressure-sensitive resistor 231 is less susceptible to this load, and the magnitude of the resistance change occurring to the pressure-sensitive resistor 231 is substantially unaffected by this load. Hence, the cylinder internal pressure P can be detected more accurately than the conventional pressure sensor.

Further, the pressure-sensitive resistor 231 is symmetrical about the center K of the pressure-sensitive part area 230ar. With this arrangement, even if the offset load component and/or the load pulsating or oscillating in the lateral direction exist in the load acting on the pressing member 225, the pressure-sensitive resistor 231 is especially less susceptible to these loads, and the magnitude of the resistance change occurring to the pressure-sensitive resistor 231 is substantially unaffected by these loads. Hence, the cylinder internal pressure P can be detected even more accurately.

In the present embodiment 2, the Si device 230 is a compression type Si device, in which the surface orientation of the first main surface 230a of the Si device 230 is {110} plane. Further, the pressure-sensitive resistor 231 has the serpentine-shape having the plurality of pressure-sensitive sections 231c extending in <110> direction of the Si device 230 and the plurality of direction turning sections 231d connecting both ends of adjacent linear pressure-sensitive sections 231c, 231c. Moreover, the shape of the direction turning section 231d is the arc shape. With this configuration and arrangement, the pressure-sensitive resistor 231 produces the resistance change according to the cylinder internal pressure P with high sensitivity in the pressure-sensitive sections 231c extending in <110> direction. In addition, since the direction turning section 231d also has a component that extends in <110> direction, these direction turning sections 231d can also produce the resistance change according to the cylinder internal pressure P. Consequently, the pressure-sensitive resistor 231 as a whole can produce the resistance change according to the cylinder internal pressure P by a large amount.

In the present embodiment 2, regarding the pressure-sensitive resistor 231, the farther in <100> direction from the center K of the pressure-sensitive part area 230ar the position of the pressure-sensitive section 231c is, the smaller the length LA in <110> direction of the pressure-sensitive section 231c. Although the sensitivity itself of each pressure-sensitive section 231c is not different, the shorter-sized pressure-sensitive sections 231c are provided in the peripheral area where the stress arising upon receiving the offset load and/or the load oscillating in the lateral direction is apt to change, while the longer-sized pressure-sensitive sections 231c are provided in the middle area where the stress arising upon receiving the offset load and/or the load oscillating in the lateral direction is less apt to change. With this arrangement, the sensitivity of the pressure-sensitive section 231c as a whole for these loads can be decreased. Thus, even if the offset load component and/or the load pulsating or oscillating in the lateral direction exist in the load acting on the pressing member 225 by the cylinder internal pressure P, the pressure-sensitive resistor 231 of the Si device 230 is less susceptible to these loads and the magnitude of the resistance change occurring to the pressure-sensitive resistor 231 is substantially unaffected by these loads. Hence, the cylinder internal pressure P can be detected even more accurately.

In the present embodiment 2, the pressure-sensitive part area 230ar of the pressure-sensitive resistor 231 is formed into circular shape. Even when the load, oscillating in the lateral direction and acting on the pressing member 225, oscillates in any direction of the lateral direction, since the pressure-sensitive part area 230ar is formed into the shape (circular shape) that has no directivity, the magnitude of the resistance change occurring to the pressure-sensitive resistor 231 is substantially unaffected by this load. Hence, the cylinder internal pressure P can be detected more accurately.

In the present embodiment 2, the whole pressure-sensitive resistor 231 is placed within the bonded area 230e on the first main surface 230a. With this arrangement, since the pressing force resulting from or according to the cylinder internal pressure P from the pressing member 225 directly acts on the whole pressure-sensitive resistor 231, the sensitivity of the pressure-sensitive resistor 231 for the cylinder internal pressure P can be further improved.

Additionally, the pressure-sensitive resistor 231 is formed so that the diameter RN of the virtual circle NE in which the pressure-sensitive resistor 231 is inscribed is set to one-half (½) or less of the length TN of the edge of the Si device 230. With this setting, since the pressure-sensitive part area 230ar where the pressure-sensitive resistor 231 is formed becomes compact, the pressure-sensitive resistor 231 of the Si device 230 is less susceptible to the stress change (deviation) in the peripheral area of the first main surface 230a, where the deviation of the stress arising upon receiving the offset load and/or the load oscillating in the lateral direction is apt to occur. Hence, the cylinder internal pressure P can be detected even more accurately.

In the present embodiment 2, because the temperature-sensitive resistor 233 is provided on the first main surface 230a of the Si device 230, the temperature T of the Si device 230 can be also detected. Further, since this temperature-sensitive resistor 233 is placed in the unbonded area 230f1 where the pressing member 225 is not bonded to the first main surface 230a of the Si device 230, the pressing force from the pressing member 225 does not directly act on the temperature-sensitive resistor 233. It is therefore possible that the resistance change becomes especially small, namely that pressure dependence of the temperature-sensitive resistor 233 can be especially diminished.

In the present embodiment 2, the pressure-sensitive resistor 231 is placed so that the center K of its pressure-sensitive part area 230ar is identical with the center H of the first main surface 230a. With this arrangement, even if the offset load component and/or the load pulsating or oscillating in the lateral direction exist in the load acting on the pressing member 225, the pressure-sensitive resistor 231 is especially less susceptible to these loads, and the magnitude of the resistance change occurring to the pressure-sensitive resistor 231 is substantially unaffected by these loads. Hence, the cylinder internal pressure P can be detected even more accurately.

In the present embodiment 2, the pressing member 225 has the glass member 225e and the metal layer 225f, and the glass member 225e is bonded to the Si device 230. Thus the pressing member 225 and the Si device 230 can be bonded together easily and surely through anodic bonding. Accordingly, the glow plug with is cylinder internal pressure sensor 200 having high reliability of the joining between the Si device 230 and the pressing member 225 can be provided.

On the other hand, the metal layer 225f adheres or is bonded to the top end side surface 225ea of the glass member 225e. For this reason, the glass member 225e is covered with the metal layer 225f. Thus when the top end surface 225a of the pressing member 225 (the metal layer 225f) receives a force (pressure) according to the cylinder internal pressure P from the intermediate member 123 touching the pressing member 225, the glass member 225e is protected against the force (pressure), and is less apt to splinter or crack. Hence, also from this point of view, the glow plug with cylinder internal pressure sensor 200 having high reliability can be provided.

In addition to the above, in the present embodiment 2, since the Si device 230 is the SOI substrate, a decrease in insulation resistance of the Si device 230 under a high temperature condition can be suppressed, and high temperature resistance of the Si device 230 (or high temperature resistance of the glow plug with cylinder internal pressure sensor 200) can be improved. Thus, the glow plug with cylinder internal pressure sensor 200 is advantageous to use in the internal combustion engine under the high temperature condition upon the detection of the cylinder internal pressure P.

Furthermore, because the glow plug with cylinder internal pressure sensor 200 of the embodiment 2 has the supporting member 127 bonded to the second main surface 230b of the Si device 230 and supporting the Si device 230, the load-carrying capacity can be improved.

Here, with regard to the pressing member 225 shown in FIG. 10, for instance, it could be formed as follows. First, through injection forming, the glass member 225e is formed. Subsequently, Cr layer is formed on the surface 225ea of this glass member 225e through sputtering, then Ni plating layer is formed on the Cr layer through electroplating. Through these processes, the metal layer 225f formed from the Cr layer and the Ni plating layer is provided. During these processes, a protective layer is formed on the area except the surface 225ea of the glass member 225e so as to protect from liquid electrolyte and other liquids. Afterwards, by removing the protective layer, the pressing member 225 shown in FIG. 10 is provided.

Embodiment 3

Next, an embodiment 3 of the present invention will be explained with reference to the drawings. The pressing member 225 in the embodiment 2 has the glass member 225e and the metal layer 225f bonded to the surface 225ea of the glass member 225e (see FIG. 14). However, the pressing member 325 of the embodiment 3 has a glass member (glass layer) 325e formed on the base end side and a metal member 325f formed on the top end side. This point differs from the embodiment 2 (see FIG. 15, cf. FIG. 14). The other portions or members are basically same as the embodiment 2, thus their explanations are omitted or will be briefly explained here.

Although the glow plug with cylinder internal pressure sensor 300 of the embodiment 3 has the same shaped pressing member 325 as the embodiment 2, this pressing member 325 is formed from the glass member 325e and the metal member 325f. The glass member 325e is formed on the base end side, as mentioned above. The glass member 325e has a flat top end surface 325ea and a base end surface 325b that is parallel to the top end surface 325ea, and has a plate shape (layer or sheet). The base end surface 325b of this glass member 325e is also the base end surface 325b of the pressing member 325. As for the metal member 325f, it is formed on the top end side of the glass member 325e, as mentioned above. The metal member 325f has a flat top end surface 325a and a base end surface 325fb that is parallel to the top end surface 325a. The metal member 325f is formed into a plate. The top end surface 325a of this metal member 325f is also the top end surface 325a of the pressing member 325.

Since the base end surface 325b of the pressing member 325 is formed from the glass member 325e, the pressing member 325 and the Si device 230 can be bonded together easily and surely through anodic bonding. Accordingly, the glow plug with cylinder internal pressure sensor 300 having high reliability of the joining between the Si device 230 and the pressing member 325 can be provided.

On the other hand, as for the top end side of the pressing member 325, the metal member 325f is formed. For this reason, when the top end surface 325a of the pressing member 325 (the metal member 325f) receives a force (pressure) according to the cylinder internal pressure P from the intermediate member 123 touching the pressing member 325, the glass member 325e is protected against the force (pressure) through the metal member 325f, and is less apt to splinter or crack. Hence, also from this point of view, the glow plug with cylinder internal pressure sensor 300 having high reliability can be provided.

With regard to the other portions or members same as the above embodiments 1 and 2, the same effects can be obtained.

Figure 15:
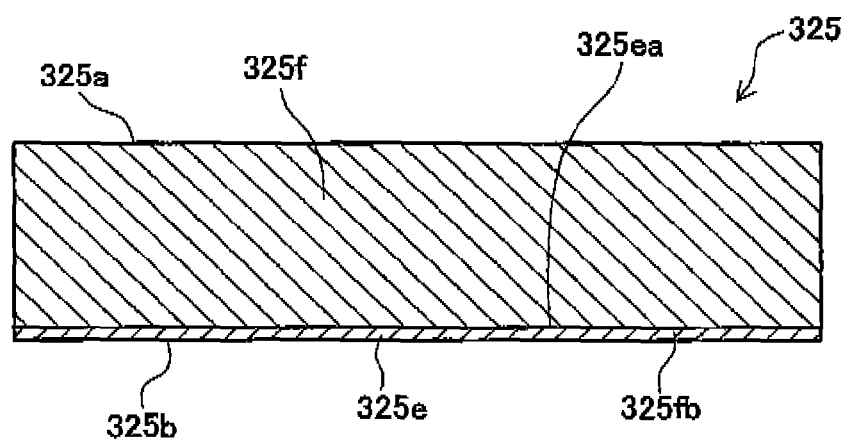
FIG. 15 is a sectional view of the pressing member, of the glow plug with cylinder internal pressure sensor of embodiment 3.

Here, with regard to the pressing member 325 shown in FIG. 15, for instance, it could be formed as follows. First, through press forming etc., the metal member 325f is formed. Subsequently, the glass layer, which is able to bond to the Si device 230 through anodic bonding, is formed on the base end surface 325fb of this metal member 325f through sputtering, then the glass member 325e is formed. Through these processes, the pressing member 325 is provided.

Although the present invention has been described above on the basis of the embodiments, the invention is not limited to the embodiments. For instance, in the above embodiments 1, 2 and 3, the pressure detection apparatus 100, 200 and 300 in which the pressure detecting system 120 is built in the glow plug, are shown. However, the pressure detection apparatus is not limited to these. The pressure detection apparatus could be the pressure detection apparatus that detects the cylinder internal pressure P without serving as the glow plug.

Further, in the above embodiments 1, 2 and 3, the SOI substrate is employed for the Si devices 130, 230 so as to improve the high temperature resistance of the Si devices 130, 230. However, if the glow plug with cylinder internal pressure sensors 100, 200 and 300 have a structure in which the Si devices 130, 230 are not exposed to the high temperature, the Si devices 130, 230 could use a Si device except the SOI substrate.

From the foregoing, the present invention gains the advantages and effects as follows.

In the present invention, a pressure sensor comprises: a Si device (130) for detecting a pressure P, which is an object of detection, through detection of a stress occurring to the Si device (130) itself by the pressure P, the Si device (130) formed from a plate-shaped SOI substrate and having (a) a first main surface (130a) that has a bonded area (130e), (b) a second main surface (130b) that is parallel to the first main surface (130a), (c) a pressure-sensitive resistor (131) which is formed on the first main surface (130a) and whose resistance changes according to the pressure P, and (d) a joining assist pattern (139) that is formed on the first main surface (130a), and a pressing member (125) bonded to the bonded area (130e) on the first main surface (130a) of the Si device (130) through anodic bonding, and compressing the Si device (130) in a thickness direction of the Si device (130) by pressing the bonded area (130e) by a pressing force according to the pressure P, and the pressure-sensitive resistor (131) has a first bonded section (131y) which is placed within the bonded area (130e) of the first main surface (130a) and is bonded to the pressing member (125), and the joining assist pattern (139) has a second bonded section (139y) which is made of the same material as the first bonded section (131y) of the pressure-sensitive resistor (131) and is placed within the bonded area (130e) of the first main surface (130a) and is bonded to the pressing member (125).

In this pressure sensor (100), the joining assist pattern (139) is formed on the Si device (130), and the Si device (130) is bonded to the pressing member (125) by not only the bonding the first bonded section (131y) of the pressure-sensitive resistor (131) but also the bonding of the second bonded section (139y) of the joining assist pattern (139) through the anodic bonding. Thus, as compared with the conventional device, the join area between the Si device (130) and the pressing member (125) can be increased by a join area between the second bonded section (139y) and the pressing member (125). As a consequence, this can enhance a connection strength between the Si device (130) and the pressing member (125) as compared with the conventional device, then reliability of the joining between the Si device (130) and the pressing member (125) can be improved.

Here, regarding the second bonded section (139y) of the joining assist pattern (139), although it is made of the same material as the first bonded section (131y) of the pressure-sensitive resistor (131), it is far preferable to form the second bonded section (139y) simultaneously with the first bonded section (131y) through the same process.

In the present invention, when an area of the whole bonded area (130e) of the first main surface (130a) is Sa (mm$^2$), an area of the first bonded section (131y) of the pressure-sensitive resistor (131) is Sb (mm²), and an area of the second bonded section (139y) of the joining assist pattern (139) is Sc (mm²), the Si device (130) satisfies a relationship of Sb+Sc≧0.9×Sa.

In this pressure sensor (100), the Si device (130) satisfies the relationship of Sb+Sc≧0.9×Sa. That is to say, the proportion of the join area, which directly pertains to the bonding, to the whole bonded area (130e) between the Si device (130) and the pressing member (125) is set to large proportion of 90% or more. Hence, the connection strength between the Si device (130) and the pressing member (125) can be especially increased, and the reliability of the joining between the Si device (130) and the pressing member (125) can be especially improved.

In the present invention, when an area of the first main surface (130a) is Sz (mm²), and an area of the whole bonded area (130e) of the first main surface (130a) is Sa (mm²), the Si device (130) satisfies a relationship of Sa≧0.7×Sz.

In this pressure sensor (100), the Si device (130) satisfies the relationship of Sa≧0.7×Sz. That is to say, the proportion of the area Sa of the bonded area (130e) is set to be greater than or equal to 70% of the area Sz of the first main surface (130a). Consequently, it is possible to gain the connection strength between the Si device (130) and the pressing member (125), then the reliability of the joining between the Si device (130) and the pressing member (125) can be improved.

In the present invention, the pressure-sensitive resistor (131) and the joining assist pattern (139) are electrically connected to each other.

In this pressure sensor (100), the pressure-sensitive resistor (131) and the joining assist pattern (139) are electrically connected to each other. Because of this, when the Si device (130) and the pressing member (125) are joined together through the anodic bonding, by connecting an anodic electrode of anodic bonding system and applying a voltage of the anodic electrode to one of the pressure-sensitive resistor (131) and the joining assist pattern (139), the voltage is also applied to the other. That is, by applying the voltage of the anodic electrode to either of the pressure-sensitive resistor (131) and the joining assist pattern (139), the anodic bonding of the Si device (130) and the pressing member (125) can be achieved easily and surely. Thus the pressure sensor (100) having high reliability of the joining between the Si device (130) and the pressing member (125) can be provided.

In the present invention, the pressure-sensitive resistor (131) as a whole is the first bonded section (131y).

In this pressure sensor (100), the pressure-sensitive resistor (131) as a whole is the first bonded section (131y), and the whole pressure-sensitive resistor (131) is placed within the bonded area (130e). With this configuration and arrangement, since the whole pressure-sensitive resistor (131) is pressed by the pressing member (125), detection sensitivity of the pressure-sensitive resistor (131) for the pressure P becomes especially high. In addition, because the pressure-sensitive resistor (131) as a whole is bonded to the pressing member (125), the join area between the Si device (130) and the pressing member (125) can be increased, as compared with a case in which only a part of the pressure-sensitive resistor (131) is bonded to the pressing member (125). Therefore, this can further enhance the connection strength between the Si device (130) and the pressing member (125), then the reliability of the joining between the Si device (130) and the pressing member (125) can be further improved.

In the present invention, the second bonded section (139y) of the joining assist pattern (139) is situated around the pressure-sensitive resistor (131).

In this pressure sensor (100), the pressure-sensitive resistor (131) is surrounded with the second bonded section (139y) of the joining assist pattern (139). This arrangement can gain the connection strength between the Si device (130) and the pressing member (125) and increase the reliability of the joining between the Si device (130) and the pressing member (125) while improving the detection sensitivity of the pressure-sensitive resistor (131) for the pressure P.

In the present invention, when a maximum distance from a center (J) of the bonded area (130e) to an outer circumferential edge (130ej) of the bonded area (130e) is L (mm), and an area where a distance La (mm) from the center (J) satisfies a relationship of La≦0.6×L is a join central area (130g) of the bonded area (130e), the whole pressure-sensitive resistor (131) is placed within the join central area (130g).

In this pressure sensor (100), as compared with the join central area (130g) where the distance La (mm) from its center (J) satisfies the relationship of La≦0.6×L, of the bonded area (130e), deviation of magnitude of the stress arising upon receiving the offset load is apt to occur in the outside join peripheral area of the join central area (130g). Thus, if a part of the pressure-sensitive resistor (131) or the whole pressure-sensitive resistor (131) is placed in the join peripheral area, variations in resistance change is apt to occur, and the accurate detection of the pressure P might be impossible. In addition, the pressing member receives not only the load acting in the direction (axial direction) orthogonal to the main surface of the Si device, but the load that pulsates or oscillates in the direction (lateral direction) orthogonal to the axial direction might act on the pressing member. Even in the case where the load oscillating in the lateral direction acts on the pressing member, as compared with the join central area (130g), in the join peripheral area, the magnitude of resistance change occurring to the pressure-sensitive resistor is affected by this load by a large amount, then the accurate detection of the pressure P might be impossible. However, in the pressure sensor (100), since the whole pressure-sensitive resistor (131) is placed within the join central area (130g), it is possible to improve the detection accuracy of the pressure P.

In the present invention, the pressure-sensitive resistor (131) is symmetrical about a center point (G) thereof, and the center point (G) is identical with a center (J) of the bonded area (130e).

In this pressure sensor (100), the pressure-sensitive resistor (131) is symmetrical about its center point (G), and this center point (G) is identical with the center (J) of the bonded area (130e). With this arrangement, even if the offset load component exists in the load acting on the pressing member (125) by the pressure P, the pressure-sensitive resistor (131) is especially less susceptible to the offset load, and the magnitude of the resistance change occurring to the pressure-sensitive resistor (131) is substantially unaffected by the offset load. Also, even when the load pulsating or oscillating in the lateral direction is applied to the pressing member (125), the pressure-sensitive resistor (131) is especially less susceptible to this load, and the magnitude of the resistance change occurring to the pressure-sensitive resistor (131) is substantially unaffected by this load. Hence, the pressure P can be detected even more accurately.

In the present invention, surface orientation of the first main surface (130a) of the Si device (130) is {110} plane, and the pressure-sensitive resistor (131) is formed into a meandering shape and has (a) a plurality of pressure-sensitive sections (131c), each of which extends in <110> direction of the Si device (130) and is arranged at certain intervals, and (b) a plurality of direction turning sections (131d), each of which has an arc shape and connects both ends of the adjacent pressure-sensitive sections (131c).

In this pressure sensor (100), the Si device (130) is the compression type Si device, in which the surface orientation of the first main surface (130a) of the Si device (130) is {110} plane. Further, the pressure-sensitive resistor (131) has the serpentine-shape having the plurality of pressure-sensitive sections (131c) extending in <110> direction of the Si device (130) and the plurality of direction turning sections (131d) connecting both ends of adjacent linear pressure-sensitive sections (131c, 131c). Moreover, the shape of the direction turning section is the arc shape. With this configuration and arrangement, the pressure-sensitive resistor (131) produces the resistance change according to the pressure P with high sensitivity in the pressure-sensitive sections (131c) extending in <110> direction. In addition, since the direction turning section (131d) also has the component that extends in <110> direction, these direction turning sections (131d) can also produce the resistance change according to the pressure P. Consequently, the pressure-sensitive resistor (131) as a whole can produce the resistance change according to the pressure P by a large amount.

Here, {110} plane indicates (110) plane or an equivalent surface orientation to this (110) plane. <110> direction indicates [110] direction or an equivalent crystal orientation to this [110] direction. Further, <100> direction indicates [100] direction or an equivalent crystal orientation to this [100] direction.

In the present invention, the pressing member (125) has a dome-shaped rounded surface which swells up in an opposite direction to the Si device (130) and whose center is a top.

In this pressure sensor (100), the top end surface (125a) of the pressing member (125), which is the opposite surface to the Si device (130), has the domed shaped rounded surface. Thus, when pressing the join area of the Si device (130) by the pressing force according to the pressure P, the Si device (130) is pressed uniformly without being affected by the offset load.

In the present invention, a pressure sensor comprises: a Si device (230) for detecting a pressure P, which is an object of detection, through detection of a stress occurring to the Si device (230) itself by the pressure P, the Si device (230) formed into a rectangular plate shape and having (a) a first main surface (230a) that has a pressure-sensitive part area (230ar), (b) a second main surface (230b) that is parallel to the first main surface (230a), (c) a pressure-sensitive resistor (231) which is formed on the first main surface (230a) and whose first resistance changes according to the pressure P, and a pressing member (225, 235) bonded to the first main surface (230a) of the Si device (230), and compressing the Si device (230) in a thickness direction of the Si device (230) by pressing the first main surface (230a) by a pressing force according to the pressure P, and the pressing member (225, 235) is bonded to the first main surface (230a) except for four corner sections (230ah1, 230ah2, 230ah3 and 230ah4) of the first main surface (230a) with the pressing member (225, 235) reaching up to four outer circumferential edges (230aj) which define the first main surface (230a), and the pressure-sensitive resistor (231) is symmetrical about a center (K) of the pressure-sensitive part area (230ar) where the pressure-sensitive resistor (231) is formed on the first main surface (230a) of the Si device (230).

In this pressure sensor (200), the Si device (230) has the rectangular plate shape having the first main surface (230a) and the second main surface (230b). And the pressing member (225) is bonded to the first main surface (230a) except for the four corner sections (230ah1, 230ah2, 230ah3 and 230ah4) of the first main surface (230a) with the pressing member (225) reaching up to the four outer circumferential edges (230aj). With this configuration, as compared with the conventional pressure sensors (disclosed in the Patent Documents 1~6), even if the offset load component and/or the load pulsating or oscillating in the lateral direction exist in the load acting on the pressing member (225) by the pressure P, the pressure-sensitive resistor (231) of the Si device (230) is less susceptible to these loads and the magnitude of the resistance change occurring to the pressure-sensitive resistor (231) is substantially unaffected by these loads. Also, even when the load pulsating or oscillating in the lateral direction is applied to the pressing member (225), the pressure-sensitive resistor (231) is less susceptible to this load, and the magnitude of the resistance change occurring to the pressure-sensitive resistor (231) is substantially unaffected by this load. Hence, the pressure P can be detected more accurately than the conventional pressure sensors by the pressure sensor (200) of the present invention.

Further, in the pressure sensor (200), the pressure-sensitive resistor (231) is symmetrical about the center (K) of the pressure-sensitive part area (230ar). With this arrangement, even if the offset load component and/or the load pulsating or oscillating in the lateral direction exist in the load acting on the pressing member (225), the pressure-sensitive resistor (231) is especially less susceptible to these loads, and the magnitude of the resistance change occurring to the pressure-sensitive resistor (231) is substantially unaffected by these loads. Hence, the pressure P can be detected even more accurately.

In the present invention, the pressure sensor further comprises: a tubular housing (110) for housing the Si device (230) and the pressing member (225, 235), and surface orientation of the first main surface (230a) of the Si device (230) is {110} plane, and the pressure-sensitive resistor (231) is formed into a serpentine shape and has (a) a plurality of pressure-sensitive sections (231c), each of which extends in <110> direction of the Si device (230) and is arranged at certain intervals, and (b) a plurality of direction turning sections (231d), each of which has an arc shape and connects both ends of the adjacent pressure-sensitive sections (231c).

In this pressure sensor (200), the Si device (230) is the compression type Si device, in which the surface orientation of the first main surface (230a) of the Si device (230) is {110} plane. Further, the pressure-sensitive resistor (231) has the serpentine-shape having the plurality of pressure-sensitive sections (231c) extending in <110> direction of the Si device (230) and the plurality of direction turning sections (231d) connecting both ends of adjacent linear pressure-sensitive sections (231c, 231c). Moreover, the shape of the direction turning section (231d) is the arc shape. With this configuration and arrangement, the pressure-sensitive resistor (231) produces the resistance change according to the pressure P with high sensitivity in the pressure-sensitive sections (231c) extending in <110> direction. In addition, since the direction turning section (231d) also has the component that extends in <110> direction, these direction turning sections (231d) can also produce the resistance change according to the pressure P. Consequently, the pressure-sensitive resistor (231) as a whole can produce the resistance change according to the pressure P by a large amount.

In the present invention, the pressure-sensitive resistor (231) is formed so that the farther in <100> direction from the center (K) of the pressure-sensitive part area (230ar) the position of the pressure-sensitive section (231c) is, the smaller the length (LA) in <110> direction of the pressure-sensitive section (231c).

In this pressure sensor (200), regarding the pressure-sensitive resistor (231), the farther in <100> direction from the center (K) of the pressure-sensitive part area (230ar) the position of the pressure-sensitive section (231c) is, the smaller the length (LA) in <110> direction of the pressure-sensitive section (231c). Although the sensitivity itself of each pressure-sensitive section (231c) is not different, the shorter-sized pressure-sensitive sections (231c) are provided in the peripheral area where the stress arising upon receiving the offset load and/or the load oscillating in the lateral direction is apt to change, while the longer-sized pressure-sensitive sections (231c) are provided in the middle area where the stress arising upon receiving the offset load and/or the load oscillating in the lateral direction is less apt to change. With this arrangement, the sensitivity of the pressure-sensitive section (231c) as a whole for these loads can be decreased. Thus, even if the offset load component and/or the load pulsating or oscillating in the lateral direction exist in the load acting on the pressing member (225) by the pressure P, the pressure-sensitive resistor (231) of the Si device (230) is less susceptible to these loads and the magnitude of the resistance change occurring to the pressure-sensitive resistor (231) is substantially unaffected by these loads. Hence, the pressure P can be detected even more accurately.

In the present invention, the pressure-sensitive part area (230ar) is formed into a circular shape.

In this pressure sensor (200), the pressure-sensitive part area (230ar) of the pressure-sensitive resistor (231) is formed into circular shape. Even when the load, oscillating in the lateral direction and acting on the pressing member (225), oscillates in any direction of the lateral direction, since the pressure-sensitive part area (230ar) is formed into the shape that has no directivity (i.e. circular shape), the magnitude of the resistance change occurring to the pressure-sensitive resistor (231) is substantially unaffected by this load. Hence, the pressure P can be detected more accurately.

In the present invention, an area except the four corner sections (230ah1, 230ah2, 230ah3 and 230ah4) of the first main surface (230a) is a bonded area (230e) that is bonded to the pressing member (225, 235), and the whole pressure-sensitive resistor (231) is placed within the bonded area (230e) on the first main surface (230a).

In this pressure sensor (200), the whole pressure-sensitive resistor (231) is placed within the bonded area (230e) on the first main surface (230a). With this arrangement, since the pressing force resulting from or according to the pressure P from the pressing member (225) directly acts on the whole pressure-sensitive resistor (231), the sensitivity of the pressure-sensitive resistor (231) for the pressure P can be further improved.

In the present invention, the pressure-sensitive resistor (231) is formed so that a diameter (RN) of a virtual circle (NE) in which the pressure-sensitive resistor (231) on the first main surface (230a) is inscribed is set to one-half (½) or less of a length (TN) of a shorter edge of the first main surface (230a).

In this pressure sensor (200), the pressure-sensitive resistor (231) is formed so that the diameter (RN) of the virtual circle (NE) in which the pressure-sensitive resistor (231) is inscribed is set to one-half (½) or less of the length (TN) of the shorter edge of the Si device (230). With this setting, since the pressure-sensitive part area (230ar) where the pressure-sensitive resistor (231) is formed becomes compact, the pressure-sensitive resistor (231) of the Si device (230) is less susceptible to the stress change (deviation) in the peripheral area of the first main surface (230a), where the deviation of the stress arising upon receiving the offset load and/or the load oscillating in the lateral direction is apt to occur. Hence, the pressure P can be detected even more accurately.

In the present invention, the Si device (230) has a temperature-sensitive resistor (233) which is formed on the first main surface (230a) and whose second resistance changes according to a temperature T of the Si device (230), a rate of change of the resistance of the temperature-sensitive resistor (233) occurring according to a change of the pressure P is smaller than that of the pressure-sensitive resistor (231), and the temperature-sensitive resistor (233) is placed in any one of the four corner sections (230ah1, 230ah2, 230ah3 and 230ah4) of the first main surface (230a).

In this pressure sensor (200), because the temperature-sensitive resistor (233) is provided on the Si device (230), the temperature T of the Si device (230) can be also detected. Further, since this temperature-sensitive resistor (233) is placed in any one of the four corner sections on the first main surface (230a), the pressing force from the pressing member (225) does not directly act on the temperature-sensitive resistor (233). It is therefore possible that the resistance change becomes especially small, namely that pressure dependence of the temperature-sensitive resistor (233) can be especially diminished.

In the present invention, the pressure-sensitive resistor (231) is placed so that the center (K) of the pressure-sensitive part area (230ar) is identical with a center (H) of the first main surface (230a).

In this pressure sensor (200), the pressure-sensitive resistor (231) is placed so that the center (K) of its pressure-sensitive part area (230ar) is identical with the center (H) of the first main surface (230a). With this arrangement, even if the offset load component and/or the load pulsating or oscillating in the lateral direction exist in the load acting on the pressing member (225), the pressure-sensitive resistor (231) is especially less susceptible to these loads, and the magnitude of the resistance change occurring to the pressure-sensitive resistor (231) is substantially unaffected by these loads. Hence, the pressure P can be detected even more accurately.

In the present invention, the pressing member (225, 235) has (a) a glass member (225e, 325e) which is made of glass and bonded to the first main surface (230a) of the Si device (230), and (b) a metal member (225f) which is made of metal and placed in an opposite side to the Si device (230).

In this pressure sensor (200), the pressing member (225) has the glass member (225e) and the metal layer (225f), and the glass member (225e) is bonded to the Si device (230). Thus the pressing member (225) and the Si device (230) can be bonded together easily and surely, for instance, through anodic bonding. Accordingly, the pressure sensor (200) having high reliability of the joining between the Si device (230) and the pressing member (225) can be provided.

In the present invention, the Si device (230) is an SOI substrate.

In this pressure sensor (200), since the Si device (230) is the SOI substrate, the decrease in insulation resistance of the Si device (230) under the high temperature condition can be suppressed, and high temperature resistance of the Si device (230) (or high temperature resistance of the pressure sensor (200)) can be improved.

In the present invention, the pressure sensor as claimed in claim 11, further comprises: a supporting member (127) which is bonded to the second main surface (230b) of the Si device (230) and supports the Si device (230).

This pressure sensor (200) has the supporting member (127), the load-carrying capacity can therefore be improved.

In the present invention, the pressure sensor is configured so that the pressure sensor can be secured to an internal combustion engine and the pressing force of the first main surface (130a, 230a) from the pressing member (125, 225, 325) varies according to a change of a cylinder internal pressure (P) of the internal combustion engine.

This pressure sensor is configured so that the pressure sensor can be secured to the internal combustion engine and the pressing force of the first main surface from the pressing member varies according to the change of the cylinder internal pressure P. Thus, by securing the pressure sensor to the internal combustion engine, the cylinder internal pressure P in the internal combustion engine can be detected.

Here, the pressure sensor could be used together with other parts or components used for the internal combustion engine, for example, the pressure sensor could be built in the glow plug as a built-in pressure sensor.

The entire contents of Japanese Patent Applications No. 2009-19789 filed on Jan. 30, 2009, No. 2009-19802 filed on Jan. 30, 2009, No. 2008-252244 filed on Sep. 30, 2008 and No. 2009-215982 filed on Sep. 17, 2009 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A pressure sensor comprising:
a Si device for detecting a pressure P, which is an object of detection, through detection of a stress occurring to the Si device itself by the pressure P, the Si device formed from a plate-shaped SOI substrate and having
(a) a first main surface that has a bonded area,
(b) a second main surface that is parallel to the first main surface,
(c) a pressure-sensitive resistor which is formed on the first main surface and whose resistance changes according to the pressure P, and
(d) a joining assist pattern that is formed on the first main surface, and
a pressing member bonded to the bonded area on the first main surface of the Si device through anodic bonding, and compressing the Si device in a thickness direction of the Si device by pressing the bonded area by a pressing force according to the pressure P, and
the pressure-sensitive resistor having a first bonded section which is placed within the bonded area of the first main surface and is bonded to the pressing member, and
the joining assist pattern having a second bonded section which is made of the same material as the first bonded section of the pressure-sensitive resistor and is placed within the bonded area of the first main surface and is bonded to the pressing member.

2. The pressure sensor as claimed in claim 1, wherein:
when an area of the whole bonded area of the first main surface is Sa (mm$^2$), an area of the first bonded section of the pressure-sensitive resistor is Sb (mm$^2$), and an area of the second bonded section of the joining assist pattern is Sc (mm$^2$),
the Si device satisfies a relationship of $Sb+Sc \geqq 0.9 \times Sa$.

3. The pressure sensor as claimed in claim 1, wherein:
when an area of the first main surface is Sz (mm$^2$), and an area of the whole bonded area of the first main surface is Sa (mm$^2$),
the Si device satisfies a relationship of $Sa \geqq 0.7 \times Sz$.

4. The pressure sensor as claimed in claim 1, wherein:
the pressure-sensitive resistor and the joining assist pattern are electrically connected to each other.

5. The pressure sensor as claimed in claim 1, wherein:
the pressure-sensitive resistor as a whole is the first bonded section.

6. The pressure sensor as claimed in claim 5, wherein:
the second bonded section of the joining assist pattern is situated around the pressure-sensitive resistor.

7. The pressure sensor as claimed in claim 1, wherein:
when a maximum distance from a center of the bonded area to an outer circumferential edge of the bonded area is L (mm), and an area where a distance La (mm) from the center satisfies a relationship of $La \leqq 0.6 \times L$ is a join central area of the bonded area,
the whole pressure-sensitive resistor is placed within the join central area.

8. The pressure sensor as claimed in claim 1, wherein:
the pressure-sensitive resistor is symmetrical about a center point thereof, and the center point is identical with a center of the bonded area.

9. The pressure sensor as claimed in claim 1, wherein:
surface orientation of the first main surface of the Si device is {110} plane, and
the pressure-sensitive resistor is formed into a meandering shape and has
(a) a plurality of pressure-sensitive sections, each of which extends in <110> direction of the Si device and is arranged at certain intervals, and
(b) a plurality of direction turning sections, each of which has an arc shape and connects both ends of the adjacent pressure-sensitive sections.

10. The pressure sensor as claimed in claim 1, wherein:
the pressing member has a dome-shaped rounded surface which swells up in an opposite direction to the Si device and whose center is a top.

11. A pressure sensor comprising:
a Si device for detecting a pressure P, which is an object of detection, through detection of a stress occurring to the Si device itself by the pressure P, the Si device formed into a rectangular plate shape and having
(a) a first main surface that has a pressure-sensitive part area,
(b) a second main surface that is parallel to the first main surface,
(c) a pressure-sensitive resistor which is formed on the first main surface and whose first resistance changes according to the pressure P, and
a pressing member bonded to the first main surface of the Si device, and compressing the Si device in a thickness direction of the Si device by pressing the first main surface by a pressing force according to the pressure P, and
the pressing member being bonded to the first main surface except for four corner sections of the first main surface with the pressing member reaching up to four outer circumferential edges which define the first main surface, and
the pressure-sensitive resistor being symmetrical about a center of the pressure-sensitive part area where the pressure-sensitive resistor is formed on the first main surface of the Si device.

12. The pressure sensor as claimed in claim 11, further comprising:
a tubular housing for housing the Si device and the pressing member, and wherein
surface orientation of the first main surface of the Si device is {110} plane, and the pressure-sensitive resistor is formed into a serpentine shape and has
- (a) a plurality of pressure-sensitive sections, each of which extends in <110> direction of the Si device and is arranged at certain intervals, and
- (b) a plurality of direction turning sections, each of which has an arc shape and connects both ends of the adjacent pressure-sensitive sections.

13. The pressure sensor as claimed in claim 12, wherein:
the pressure-sensitive resistor is formed so that the farther in <100> direction from the center of the pressure-sensitive part area the position of the pressure-sensitive section is, the smaller the length in <110> direction of the pressure-sensitive section.

14. The pressure sensor as claimed in claim 13, wherein:
the pressure-sensitive part area is formed into a circular shape.

15. The pressure sensor as claimed in claim 11, wherein:
an area except the four corner sections of the first main surface is a bonded area that is bonded to the pressing member, and
the whole pressure-sensitive resistor is placed within the bonded area on the first main surface.

16. The pressure sensor as claimed in claim 11, wherein:
the pressure-sensitive resistor is formed so that a diameter of a virtual circle in which the pressure-sensitive resistor on the first main surface is inscribed is set to one-half (½) or less of a length of a shorter edge of the first main surface.

17. The pressure sensor as claimed in claim 11, wherein:
the Si device has a temperature-sensitive resistor which is formed on the first main surface and whose second resistance changes according to a temperature T of the Si device,
a rate of change of the resistance of the temperature-sensitive resistor occurring according to a change of the pressure P is smaller than that of the pressure-sensitive resistor, and
the temperature-sensitive resistor is placed in any one of the four corner sections of the first main surface.

18. The pressure sensor as claimed in claim 11, wherein:
the pressure-sensitive resistor is placed so that the center of the pressure-sensitive part area is identical with a center of the first main surface.

19. The pressure sensor as claimed in claim 11, wherein:
the pressing member has
- (a) a glass member which is made of glass and bonded to the first main surface of the Si device, and
- (b) a metal member which is made of metal and placed in an opposite side to the Si device.

20. The pressure sensor as claimed in claim 11, wherein:
the Si device is an SOI substrate.

21. The pressure sensor as claimed in claim 11, further comprising:
a supporting member which is bonded to the second main surface of the Si device and supports the Si device.

22. The pressure sensor as claimed in claim 11, wherein:
the pressure sensor is configured so that the pressure sensor can be secured to an internal combustion engine and the pressing force of the first main surface from the pressing member varies according to a change of a cylinder internal pressure of the internal combustion engine.

* * * * *